United States Patent
Sallas et al.

(10) Patent No.: US 9,482,765 B2
(45) Date of Patent: Nov. 1, 2016

(54) VIBRATOR SOURCE ARRAY LOAD-BALANCING METHOD AND SYSTEM

(71) Applicant: CGG SERVICES SA, Massy (FR)

(72) Inventors: John Sallas, Plano, TX (US); Benoit Teyssandier, Massy (FR)

(73) Assignee: CGG SERVICES SA, Massy (FR)

( * ) Notice: Subject to any disclaimer, the term of this patent is extended or adjusted under 35 U.S.C. 154(b) by 312 days.

(21) Appl. No.: 14/166,205

(22) Filed: Jan. 28, 2014

(65) Prior Publication Data
US 2014/0241116 A1  Aug. 28, 2014

Related U.S. Application Data

(60) Provisional application No. 61/767,845, filed on Feb. 22, 2013, provisional application No. 61/767,841, filed on Feb. 22, 2013.

(51) Int. Cl.
*G01V 1/00* (2006.01)
*G01V 1/38* (2006.01)

(52) U.S. Cl.
CPC ............... *G01V 1/003* (2013.01); *G01V 1/006* (2013.01); *G01V 1/3843* (2013.01)

(58) Field of Classification Search
CPC ..... G01V 1/003; G01V 1/006; G01V 1/3843
USPC ..................................................... 367/14, 15
See application file for complete search history.

(56) References Cited

U.S. PATENT DOCUMENTS 3,806,863 A * 4/1974 Tilley .................. G01V 1/3808
                                                            367/21
4,546,459 A * 10/1985 Congdon .............. B06B 1/0655
                                                            367/155
4,918,668 A    4/1990 Sallas
5,511,040 A    4/1996 Nyland
8,205,711 B2 * 6/2012 Hopperstad .......... G01V 1/3861
                                                            181/110
2010/0149912 A1 6/2010 Yang et al.
2013/0100778 A1 4/2013 Ruet et al.

FOREIGN PATENT DOCUMENTS

WO     2008/068730 A2    6/2008

OTHER PUBLICATIONS

"List of formulas in elementary geometry," Wikipedia, Jan. 6, 2012, downloaded Jan. 27, 2016 from https://en.wikipedia.org/w/index.php?title=List_of_formulas_in_elementary_geometry&oldid=469813835, 2 pages.*
R. Brune, et al., "Evaluating Vibrator Spacing Including Mutual Admittance Interaction Effects", SEG International Exposition and 83rd Annual Meeting, Houston, Texas, Sep. 22-27, 2013, pp. 136-140, XP007922815.
International Search Report mailed Sep. 8, 2014, in related International Application No. PCT/EP2014/053334.
Written Opinion mailed Sep. 8, 2014, in related International Application No. PCT/EP2014/053334.

* cited by examiner

*Primary Examiner* — Daniel L Murphy
(74) *Attorney, Agent, or Firm* — Patent Portfolio Builders PLLC

(57) ABSTRACT

Method and controller for finding a best distribution of source elements that form a vibratory source array. The method includes inputting plural constraints for the source elements; generating plural distributions of the source elements that fulfill the plural constraints; calculating for each distribution a first attribute characterizing the source array; and selecting the best distribution from the plural distributions based on a value of the first attribute.

20 Claims, 26 Drawing Sheets

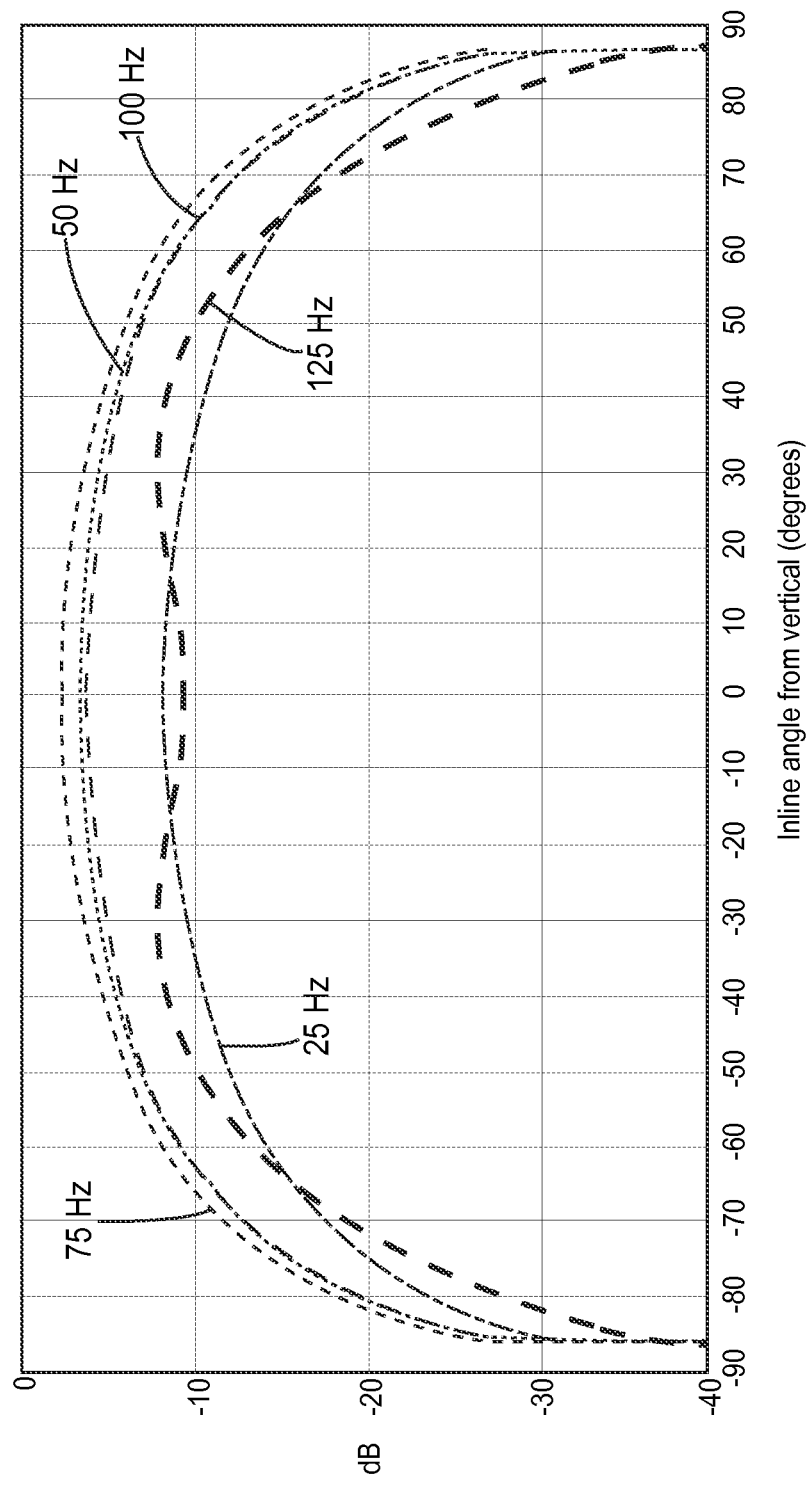

ically relate to methods and systems and, more particularly, to mechanisms and techniques for balancing a load experienced by individual vibratory source elements that form a vibrator source array and/or for shaping a beam emitted by the source array.

VIBRATOR SOURCE ARRAY LOAD-BALANCING METHOD AND SYSTEM

CROSS REFERENCE TO RELATED APPLICATIONS

The present application claims the benefit of priority under 35 U.S.C. §119(e) to U.S. Provisional Application Nos. 61/767,841 filed on Feb. 22, 2013 and 61/767,845 filed on Feb. 22, 2013. The entire contents of each of the above documents is hereby incorporated by reference into the present application.

BACKGROUND

1. Technical Field

Embodiments of the subject matter disclosed herein generally relate to methods and systems and, more particularly, to mechanisms and techniques for balancing a load experienced by individual vibratory source elements that form a vibrator source array and/or for shaping a beam emitted by the source array.

2. Discussion of the Background

Reflection seismology is a method of geophysical exploration to determine the properties of a portion of a subsurface layer in the earth, information that is especially helpful in the oil and gas industry. Marine reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

For marine applications, sources are mainly impulsive (e.g., compressed air is suddenly allowed to expand). One of the most used sources is airguns which produce a high amount of acoustic energy over a short time. Such a source is towed by a vessel either at the water surface or at a certain depth. The acoustic waves from the airgun propagate in all directions. The emitted acoustic waves' typical frequency range is between 6 and 300 Hz. However, the frequency content of the impulsive sources is not fully controllable, and different sources are selected depending on the needs of a particular survey. In addition, the use of impulsive sources can pose certain safety and environmental concerns.

Thus, another class of sources that may be used are vibratory sources. Vibratory sources, including hydraulically-powered, electrically-powered or pneumatically-powered sources and those employing piezoelectric or magnetostrictive material, have been used in marine operations. However, there is no large-scale use of such sources because they have limited power and are unreliable due to the number of moving parts required to generate seismic waves. A positive aspect of vibratory sources is that they can generate signals that include various frequency bands, commonly referred to as "frequency sweeps." In other words, the frequency band of such sources may be better controlled, as compared to impulsive sources.

One example of such a vibratory source is described in U.S. patent application Ser. No. 13/415,216 (herein the '216 application), filed on Mar. 8, 2012, and entitled "Source for Marine Seismic Acquisition and Method," assigned to the same assignee as the present application, the entire content of which is incorporated herein by reference.

However, when combining plural vibratory source elements to form a vibratory source array, in order to generate more energy, the load on each vibratory source element increases. It is known that the dominant load a vibratory source element (sometimes called an acoustic projector) sees is the radiation impedance. At low frequencies, this is dominated by what looks like a mass loading. When more than one vibratory source element is used (i.e., a vibratory source array), then an additional load called mutual impedance is created by the effect of other vibratory source elements in the array. Also, ghost reflections from the air/water boundary can come into play.

The loading effect of mutual impedance is of greatest concern for the case when the overall dimension of the source array is small (typically, less than one wavelength in size). For arrays of large dimension (useful for beam-forming, i.e., to direct acoustic energy in a preferred direction), the mutual impedance loading is of less concern. With large arrays the source elements tend to be spread farther apart, so the mutual impedance loading tends to be less of an issue.

Thus, it is desirable to judiciously locate the array elements so the total load impedance each source element sees can be better balanced to maximize total output. Accordingly, it would be desirable to provide systems and methods that minimize load impedance for each vibratory source element and maximize energy output to overcome the aforedescribed problems and drawbacks.

SUMMARY

According to one embodiment, there is a method for finding a best distribution of source elements that form a vibratory source array. The method includes inputting plural constraints for the source elements; generating plural distributions of the source elements that fulfill the plural constraints; calculating for each distribution a first attribute characterizing the source array; and selecting the best distribution from the plural distributions based on a value of the first attribute.

According to another embodiment, there is a method for finding a best distribution of source elements that form a vibratory source array. The method includes inputting plural constraints for the source elements; generating plural distributions of the source elements that fulfill the plural constraints; calculating for each distribution and for each source element a total acoustic radiation impedance; selecting a maximum total acoustic radiation impedance from total acoustic radiation impedances corresponding to the source elements; and selecting the best distribution from the plural distributions based on a minimization process applied to the maximum total acoustic impedance.

According to yet another embodiment, there is a controller for calculating a best distribution of source elements that form a vibratory source array. The controller includes an interface for receiving plural constraints for the source elements; and a processor connected to the interface. The processor is configured to generate plural distributions of the source elements that fulfill the plural constraints; calculate for each distribution a first attribute characterizing the source array; and select the best distribution from the plural distributions based on a value of the first attribute.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 17A and 17B illustrate an amplitude versus vertical angle response for various frequencies, in an inline and cross-line direction, respectively, according to an embodiment;

DETAILED DESCRIPTION

Figure 1:
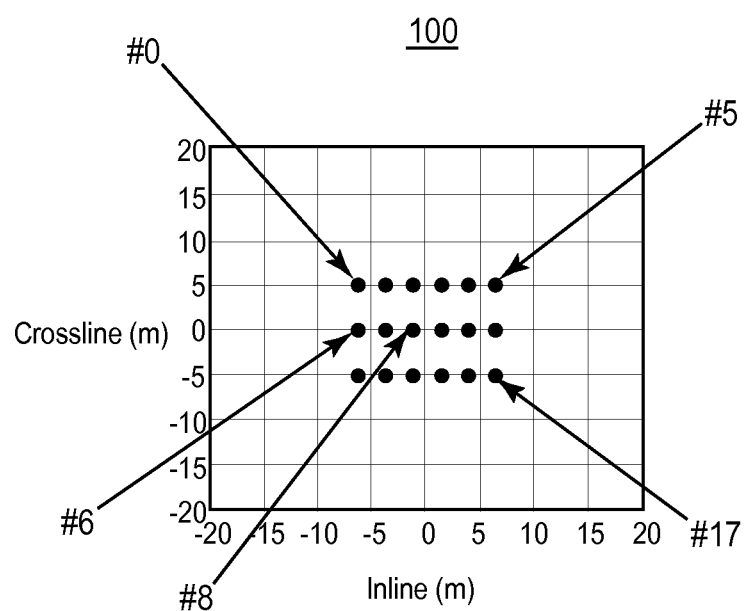
FIG. 1 is a schematic diagram of a non-optimized single depth source array for which the source elements distribution has a uniform spacing in the inline direction.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a vibratory source array that includes plural individual vibratory source elements configured to generate acoustic energy in a marine environment. However, the embodiments to be discussed next are not limited to a marine environment; they may be applied to any type of source array in which its individual elements interact with each other while shooting or in which control of a shape of the source array's output beam is desired.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a vibratory source array having one or more seismic vibro-acoustic source elements. A seismic vibro-acoustic source element is a unit capable of producing an acoustic wave. A source array may include one or more seismic vibro-acoustic source elements. For simplicity, a seismic vibro-acoustic source element is referred to as a "source element," and the entire vibratory source array is referred to as a "source array." A source element may have an electro-magnetic linear actuator system configured to drive a piston (or a pair of pistons). However, it is possible to have a hydraulic, pneumatic or piezoelectric actuator or other appropriate mechanisms instead of the electro-magnetic actuator. Each source element may be driven by an appropriate pilot signal. A pilot signal is designed as a source array target signal such that the total array far-field output follows a desired target power spectrum. A drive signal derived from the pilot signal is applied to each source element. For the case where all the source array elements are identical and in phase with one another, the pilot signal and drive signal may be identical. In special cases, where for example, the array elements are not in phase, as might occur in beam-forming applications, the drive signals applied to each source element may not have the same phase or amplitude spectrum as the pilot signal. A pilot signal may have any shape, e.g., pseudo-random, cosine or sine, increasing or decreasing frequency, etc. The source array driving frequencies are a set or range of frequencies that are to be generated by the source array. For example, drive frequencies may be generated consecutively as might be the case for a swept sine wave pilot signal, or effectively simultaneously or semi-simultaneously, as might be the case if a pseudo-random pilot signal were employed.

To illustrate the problems faced by a source array that is not optimized for load balancing, consider the source array 100 illustrated in FIG. 1 which includes 18 source elements, numbered from 0 to 17. This is a mid-size array having three lines of six source elements, each source element being a twin-piston actuator as described in the '216 application. A line is considered to include a given number of source elements attached to a common cable towed by a vessel.

Figure 2:
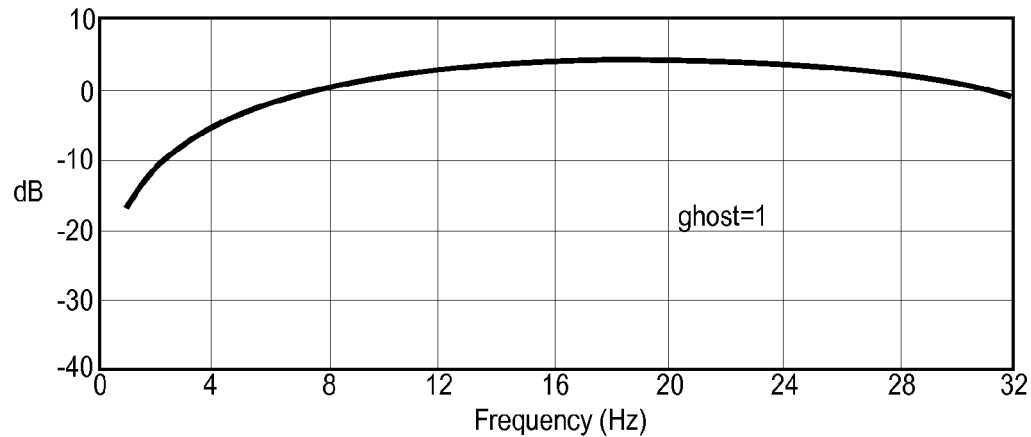
FIG. 2 illustrates a pressure of a non-optimized source array versus frequency.
Figure 3:
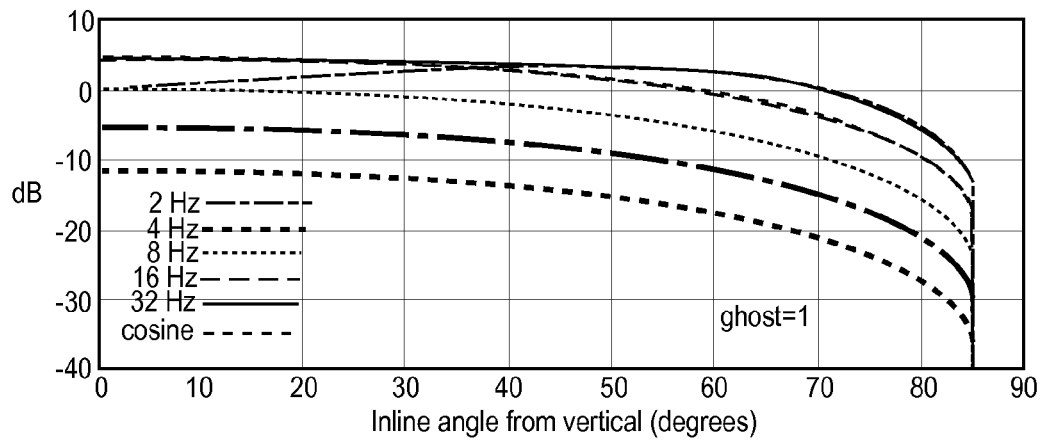
FIG. 3 illustrates an inline directivity of the output of a typical non-optimized source array.
Figure 4:
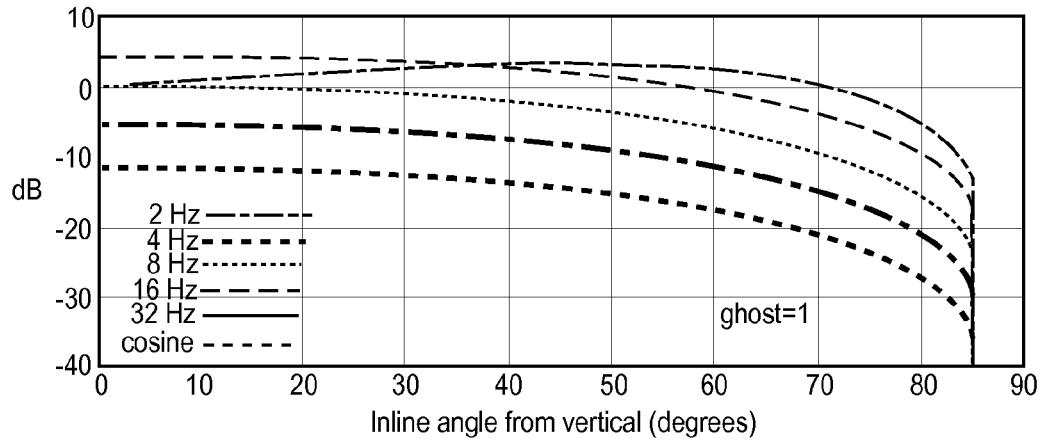
FIG. 4 illustrates a cross-line directivity of the output of a typical non-optimized source array.
Figure 5:
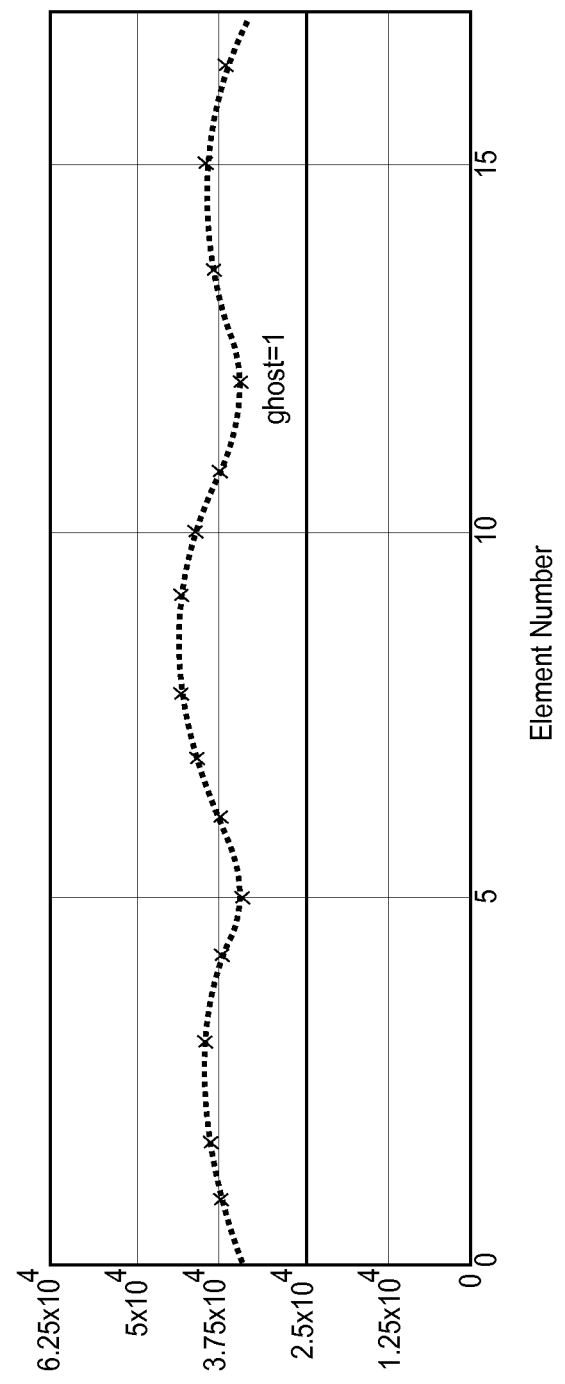
FIG. 5 illustrates a radiation impedance per piston for a typical non-optimized source array.
Figure 6:
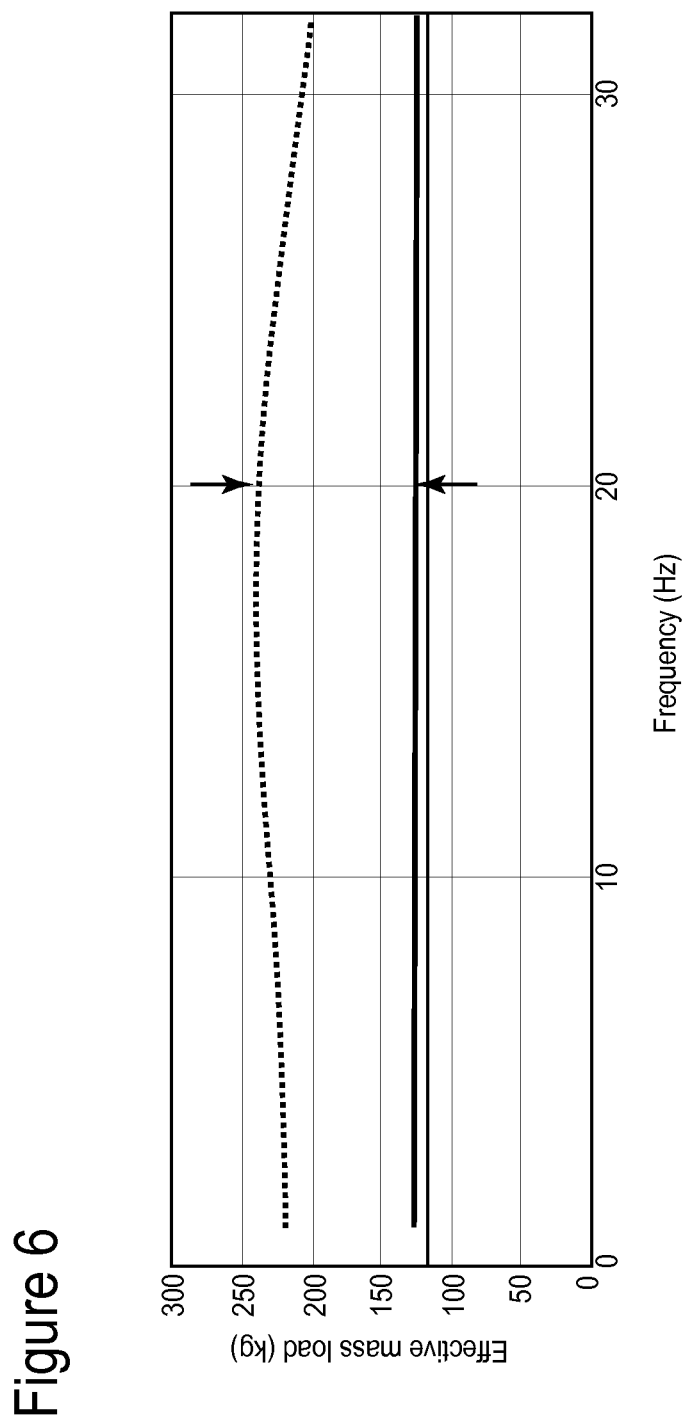
FIG. 6 illustrates a total radiation mass and a self-impedance mass for a given source element for a typical non-optimized source array.

Thus, a line of source elements may be a source sub-array. An inline spacing between the source elements is about 2.5 m, and a cross-line spacing is about 5 m, where the inline direction is along the towing direction, and the cross-line direction is substantially perpendicular to the inline direction, in the water surface plane. Each source element has a similar depth, of about 19 m. Theoretical calculations show for this source array a vertical down-going pressure versus frequency in FIG. 2, an inline directivity versus frequency in FIG. 3, and a cross-line directivity versus frequency in FIG. 4. The output levels shown in FIGS. 2-4 are normalized with 0 dB corresponding to the array output at 32 Hz for energy radiated vertically downward. FIG. 5 shows the total impedance and self-impedance for each source element at 32 Hz, and FIG. 6 shows the total impedance mass and self-impedance equivalent radiation mass for element no. 8 versus frequency. As noted in FIG. 5, the impedance for some source elements (e.g., source elements 8 and 9) is much larger than for other source elements, and the total effective mass load (see FIG. 6) is larger for some frequencies (e.g., around 20 Hz) than for other frequencies, which is undesirable. These graphs suggest that the source array's source elements are not efficiently loaded.

After plotting the same graphs (not shown) for various source array sizes and various distributions of the source elements within the source arrays, it was determined that the physical locations of the source elements within the source array greatly influence the impedances and effective mass loads. Thus, according to an embodiment, a method was designed to determine, for a given source array, a location of each source element (i.e., source elements distribution) that minimizes an impedance load per source element and maximizes a total energy output of the entire source array. As those skilled in the art would recognize, many criteria may be used for optimizing a marine vibratory source load. The following embodiments investigate a few of those criteria, but it is understood that the novel methods also apply to other criteria.

A method for calculating the load distribution for a source array is now discussed. As noted above, with source arrays, an additional load is "seen" by each source element due to other source elements operating nearby. The closer the source elements are to one another, the greater the interaction and mutual impedance become. The mutual impedance effect adds extra loading on the actuators used to drive the source elements. In source arrays comprised of many source elements, the effect can be significant. For example, with source elements arranged on a regular rectangular grid, the source elements operating near the center of that array will experience significantly more loading than those near the periphery. If the actuator force that can be applied is limited, this means the source elements near the center of the source array in this example will not be able to generate as much acoustic output as source elements located in the periphery. If however, the source elements can be optimally spaced so the loading is more balanced, overall source array output can be maximized.

Placement of source elements within the source array may be constrained by several factors, two of them being: 1) towing logistics, and 2) array directivity issues. Regarding the first factor, if N identical acoustic source elements are considered to operate at the same depth, to evenly distribute the load, the source elements would be arranged evenly around a circle. However, this arrangement is not practical for towing the source array behind a vessel because the number of source lines a vessel can tow is limited. Also, it is undesirable for the source array's dimensions to become too large because it will lead to, among other things, uneven illumination due to array directivity, the result being that energy at large offsets may be significantly reduced.

Thus, in one embodiment, a novel method uses a cost function(s) containing one or more terms, such as: total array output, directivity penalty, and logistic penalty. An objective function to be optimized can be represented as a cost function J to be minimized or as a performance index Q to be maximized. The objective function is constructed so that for a given number of source elements, the total source array output is maximized without incurring large penalties for directivity and logistics (ease of deployment and towing). For example, the cost function J can be minimized by either performing a grid search or gradient search techniques. In one application, another constraint is considered instead of the directivity, together with the source array output. In another application, if the source array includes identical source elements, minimizing the maximum loading seen by any piston could be used in the cost function as a means to maximize output.

The cost function J to be optimized might take the form, for example, of a weighted least squares cost function. Cost function J could include terms inversely proportional to total array output, directly proportional to the number of source tow lines, and directly proportional to the deviation of the array directivity pattern from a target directivity pattern for a given range of frequencies. The cost function can include a weighting function that ascribes the relative importance of the various terms included in the cost function. Those skilled in the art would recognize that the cost function may have another structure or may include some other factors that affect a marine seismic survey. However, irrespective of the structure and composition of the cost function, the process of using a cost function for determining the source elements' location within the source array is the subject of FIGS. 7 to 18.

Next, some mathematics used to calculate the cost function is discussed. The Pritchard approximation is used for estimating the interaction between piston source elements of a source array. For this specific example, each vibrator has two pistons that move in opposite directions (outward together or inward together). For clarification, even though a vibrator may have two pistons, each single piston will be treated as an individual source element whether it is packaged in the same vibrator or in a different vibrator. Assuming that d>>a, where "d" is the distance between two pistons and "a" is the piston radius, then Ka<<1, where K is the wavenumber. Further, scattering is ignored, i.e., one source element does not "shade" another source element.

The radiation impedance for a vibrating acoustic piston is the total force applied to the medium by the piston face divided by the piston velocity at the applied frequency. For the case where all source elements are identical and operate at the same volumetric velocity, the mutual impedance between piston no. 1 and piston no. 2 is given by:

$$Z_{1,2} = R\text{self}\{\sin(Kd) + j\cos(Kd)\}/Kd \quad (1)$$

where $Z_{1,2}$ is the mutual impedance load on piston no. 1 due to piston no. 2, and Rself is the real part of the self-impedance (Zself=Rself+jXself) of piston no. 1. In equation (1), "j" is an imaginary number equal to square root of negative 1. The total radiation impedance for the "m" piston is then given by:

$$Z\text{tot}_m = Z\text{self}_m + \text{Sum}\{Z_{m,n} \text{ for } n \text{ different from } m\}. \quad (2)$$

The summation operation "Sum" for the mutual impedance contributions from each vibrating piston of the source array other than piston "m" may be performed to estimate the total loading on piston "m." At drive frequencies, for which the piston radius is less than a quarter wavelength, the radiation impedance is dominated by the imaginary part (reactive part) that can be modeled as a radiation mass. In our case, the piston size is small compared to a wavelength and so it is convenient to represent the overall piston loading term as an equivalent radiation mass.

Equation (1) may be modified to include a phase difference iv between pistons, i.e., a phase difference between piston "m" and piston "n" and also piston axial velocities V1, V2 and projection areas A1, A2 (i.e., projections in a plane perpendicular to a shaft that actuates the pistons for those cases in which the shape of the piston is not planar, e.g., hemi-spherical) of the first and second pistons. In this case, the mutual impedance between piston no. 1 and piston no. 2 is given by:

$$Z_{1,2} = R\text{self}\{[\sin(Kd) + j\cos(Kd)](e^{j\psi})/Kd\}[(A_2V_2)/(A_1V_1)]. \quad (3)$$

The surface ghost effect for each piston is treated as a "negative mutual impedance" contribution located above the water line at a distance equal to the respective vibrating piston depth.

Figure 7:
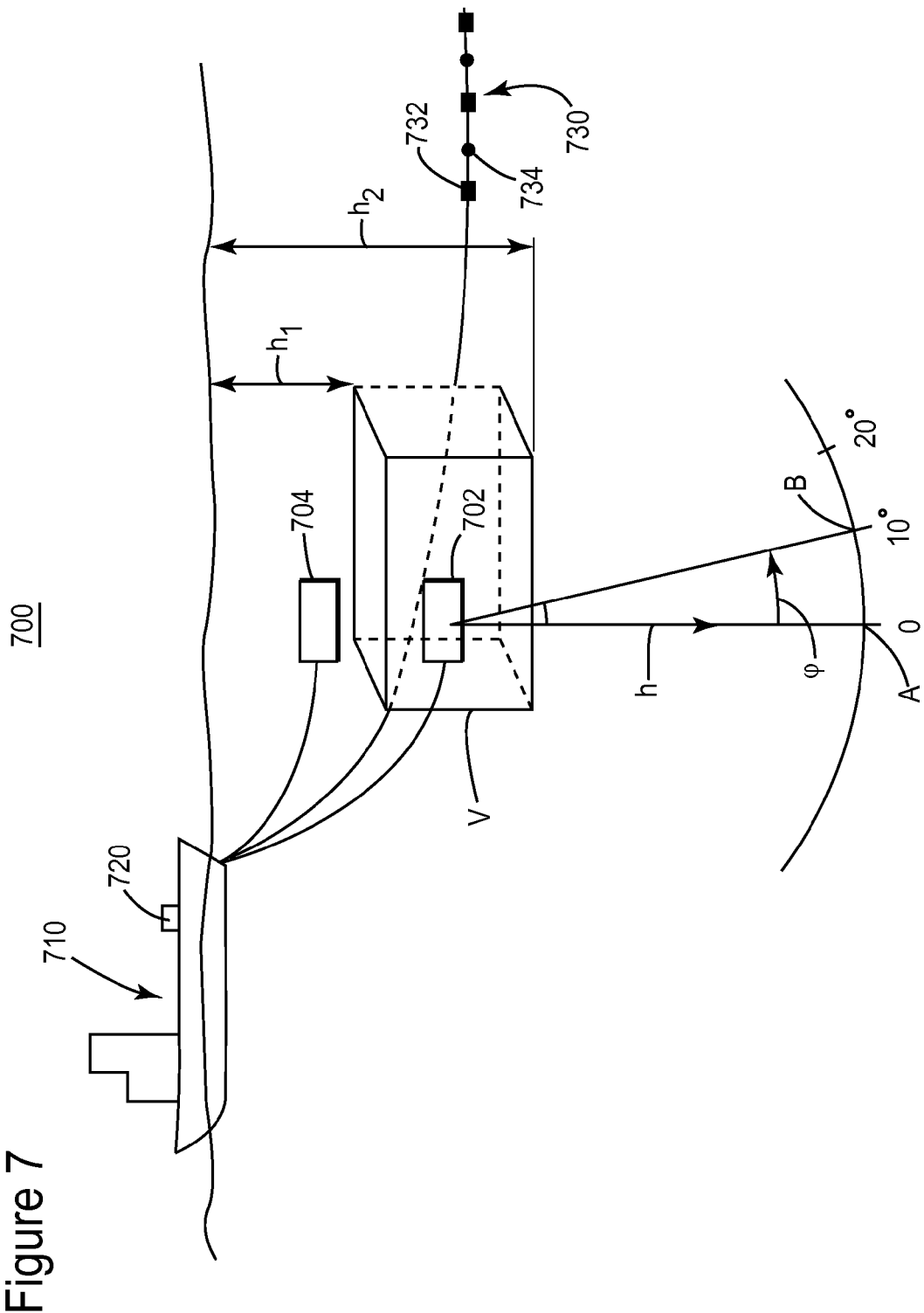
FIG. 7 is a schematic diagram of a seismic survey system having a source array optimized according to an embodiment.

Further, as illustrated in FIG. 7, a source array 700 may include a low-frequency array 702 and a high-frequency array 704 towed at different depths by a vessel 710. The novel method to be discussed with regard to maximizing an array output may be applied only to the low-frequency array 702, only to the high-frequency array 704, or to both at the same time. For simplicity, the method is illustrated in the following embodiment only for the low-frequency array 702. Vessel 710 may include a controller 720 configured to receive input from an operator and to calculate the source elements distribution that achieves a desired acoustic impedance load or beam shape or other desired attribute. Controller 720 may be configured to have other capabilities, for example, to interact with the navigation system, to control various birds 732 distributed along a streamer 730, to receive seismic data from seismic receivers 734, which may be single-component, multi-component, etc. Streamer 730 may have various shapes, i.e., linear, curved, variable-depth, etc. Controller 720 may also be configured to command other position control devices not shown in FIG. 7 that are used to maintain the desired source array element spatial distribution, for example, with some or all source elements being controlled to occupy a common depth or, in other cases, to follow a variable depth profile like a curved profile.

The low-frequency array is considered to emit seismic waves in the frequency range of 5 to 25 Hz. Other numbers for this range are possible but are not relevant for this disclosure. Some constraints used for determining the cost function are: directivity pattern, maximum operating depth, maximum source array dimension, maximum number of towed lines. These constraints are schematically illustrated in FIG. 7. For the directivity pattern, a pressure emitted by all the pistons of the source array is calculated at a given depth h below the source array 702. The pressure may be calculated at a point A vertically below the source array (i.e., vertical angle $\phi=0°$), at a point B making an angle of 10°, and so on. For this example, and ideally, for each frequency of interest, the pressure has the same value at all these points for good downward beam directivity. However, in practice, if the pressure is substantially constant for an angle between zero and 30°, the beam directivity is considered to be good enough. Of course, the value of 30° is exemplary, and it may take any value between 20° and 40°. It might also be desirable to have this substantially constant output (for a given vertical angle) be maintained over a range of azimuth angles (not depicted).

The operating depth constraint for the low-frequency source array 702 may be given by a range of depths h1 and h2 as illustrated in FIG. 7, while the maximum source array dimension may be related to, if source array 702 extends in a 2D plan substantially parallel to the water surface, the size of a square or rectangle in which the source elements are distributed. These two constraints may be combined in one that is described by a volume V in which the source elements need to be distributed. The maximum number of towed lines constraint refers to how many sub-arrays (i.e., lines) are towed by vessel 710 to accommodate all the source elements of source array 702. Traditionally this number is three or four, but other numbers may be used.

In the following embodiment, cost function J is constructed so that, for a given number of source elements, the total array output is maximized while the total output per source element is kept below a given (threshold) value. In one application, the maximum load "seen" by any piston of the source array can be minimized. Thus, cost function J to be minimized, could include terms proportional to the maximum loading of a piston element (see, e.g., equation (2)), directly proportional to the number of source tow lines (see, e.g., equation (3)), and directly proportional to the deviation of the array directivity pattern from a target directivity pattern for a given range of frequencies.

Regarding the array directivity pattern, it can be calculated as noted below (in this case the source elements are assumed to have identical outputs):

$$Pfar(\Theta, \Phi, v) := \frac{SA \cdot \rho}{4 \cdot \pi} \cdot \left| \sum_{ia=0}^{Nsource-1} (\text{Direct}(\Theta, \Phi, v, ia) - \text{Ghost}(\Theta, \Phi, v, ia)) \right|, \quad (4)$$

$$\text{Direct}(\Theta, \Phi, v, ia) := \frac{e^{-\frac{t \cdot 2 \cdot \pi \cdot v}{c} \sqrt{(x_{ia} - R \cdot \sin(\Phi) \cdot \cos(\Theta))^2 + (y_{ia} - R \cdot \sin(\Phi) \cdot \sin(\Theta))^2 + (z_{ia} - R \cdot \cos(\Phi))^2}}}{\sqrt{(x_{ia} - R \cdot \sin(\Phi) \cdot \cos(\Theta))^2 + (y_{ia} - R \cdot \sin(\Phi) \cdot \sin(\Theta))^2 + (z_{ia} - R \cdot \cos(\Phi))^2}}, \quad (5a)$$

$$\text{Ghost}(\Theta, \Phi, v, ia) := \frac{e^{-\frac{t \cdot 2 \cdot \pi \cdot v}{c} \sqrt{(x_{ia} - R \cdot \sin(\Phi) \cdot \cos(\Theta))^2 + (y_{ia} - R \cdot \sin(\Phi) \cdot \sin(\Theta))^2 + (-z_{ia} - R \cdot \cos(\Phi))^2}}}{\sqrt{(x_{ia} - R \cdot \sin(\Phi) \cdot \cos(\Theta))^2 + (y_{ia} - R \cdot \sin(\Phi) \cdot \sin(\Theta))^2 + (-z_{ia} - R \cdot \cos(\Phi))^2}} \quad (5b)$$

where the centroid of the combination of the source array and the notional sources used to model the ghost reflection, is assumed to be the origin. In equations (4)-(5b), SA is the surface area of the piston, v is the frequency to be evaluated in Hz, and $\rho$ is the density of seawater. The far-field pressure Pfar is calculated at a point far away (from the origin) in space at a distance R, located at spherical angle $\Phi$ measured away from the vertical, and at azimuth angle $\Theta$. To further clarify these angles, an azimuth of 0° corresponds to a vector pointing toward the rear of vessel (the inline direction) and an azimuth of +90° corresponds to a vector pointing orthogonal to the inline direction, i.e., along the cross-line direction. The coordinates: $x_{ia}$, $y_{ia}$ and $z_{ia}$ are the candidate source positions of the $ia^{th}$ piston, where x is the inline position, y is the cross-line position and z is the depth. The surface ghost is treated as a notional source above the sea surface of opposite polarity. With these notations, equation (4) defines the far-field pressure and includes two components: the direct (primary) arrival as defined in equation (5a) and the ghost notional source as defined in equation (5b). Note that the free surface of the water is assumed to have a reflection coefficient of −1, so the ghost contribution is in effect subtracted from the direct arrival as shown in equation (4).

A method for calculating the source elements distribution for a given source array is now discussed with reference to FIG. 8. In step 800, the search range (e.g., the number of towed source lines) and the grid spacing are input by the search operator. For example, the search range may be 3 towed source lines and the grid spacing may be 2 m. The grid spacing may be selected to be larger than the axial distance between two pistons mounted on the same vibrator. In one application, the axial length of a vibrator is about 2 m.

In step 802, another constraint is input by the survey operator, i.e., the geometrical constraints of the source array. The geometrical constraints may include the size of volume V shown in FIG. 7 and also its depth relative to water surface. In other words, geometrical constraints mark the boundaries of the source array and may be as simple as a curve having an inline length of 30 m and a depth range of 15 to 30 m.

In step 804, cost function J is initialized to have a large value. Note that many different cost functions may be selected. The process will perform a number N of iterations, where the operator can select N at the beginning of the algorithm. In step 806, a value of a counter n is incremented, and in step 808 a first distribution of the source elements within the given constraints is selected. In step 810, the total acoustic impedance seen by each piston at a given frequency is calculated, for example, based on equation (2). Note that it is also possible to calculate the total acoustic impedance based on equation (3). The given frequency may be about 25 Hz if the low-frequency array 702 has a frequency range of about 5 to 25 Hz. This is so because beam directivity is a function of frequency, and it is expected that the worst directivity is present at the highest operating frequency, i.e., 25 Hz for this case. Also, radiation impedance increases with frequency and, thus, the highest loading occurs at 25 Hz for this source array. Therefore, it is necessary to evaluate only the acoustic impedance at 25 Hz and not at other frequencies for this source array. However, the value of the given frequency may be larger or smaller, depending on the frequency range of the low-frequency source array.

The cost function for iteration n is $J_n$ and it is calculated in step 812 as the maximum total radiation impedance seen by any source element in the source array, i.e., the highest of the impedances calculated in step 810. In step 814, $J_n$ is compared to J and, if $J_n$ is larger than J, the source elements distribution selected in step 808 is not good and the process returns to step 806 to try another distribution. However, if $J_n$ is smaller than J, the process may advance to step 816 for evaluating the far-field amplitude, at 25 Hz, for several vertical angles corresponding to several azimuths of interest and compute the beam deviation factor as noted above with regard to equations (4) to (5b). For example, the beam deviation factor could actually be proportional to the radiated far-field pressure. The beam deviation factor has a value between 0 and 1, and a threshold of, e.g., 0.8, may be considered to be an acceptable beam deviation value. This value may change depending on the needs of the survey. The deviation value calculated in step 816 is checked in step 818 against the threshold. If the deviation is smaller than the threshold, the process returns to step 806 to evaluate another candidate array element distribution. However, if the deviation is larger than the threshold, the selected distribution is good, the value of cost function J is renewed in step 820, and the selected distribution is saved in step 822, after which the process returns to step 806 to search for a better distribution. The new value for cost function J may be set as a percentage (e.g., 99%) of the original cost function or the value of $J_n$. The algorithm may be run a given number of times N, e.g., a few millions or billions of times or any other larger number, depending on computing power and available time, until a better source elements distribution is found. A wide variety of methods for selecting candidate array positions can be employed ranging from random selection to more sophisticated gradient search schemes.

After the best source elements distribution is found, positions of the source elements are provided to that controller that implements the source array to ensure it uses the calculated positions. The method discussed above with regard to FIG. 8 may have a cost function J that depends on other constraints, not only on the geometry, number of lines, and beam deviation factor. Those skilled in the art would also recognize that some of the constraints used above may be modified; for example, the beam deviation factor may be substituted with a beam intensity factor or could be a measure of the ratio of the resultant candidate beam intensity to a target beam shape intensity averaged over a range of ray path angles or some other metric useful for comparing the candidate beam shape against a target beam shape.

Figure 8:
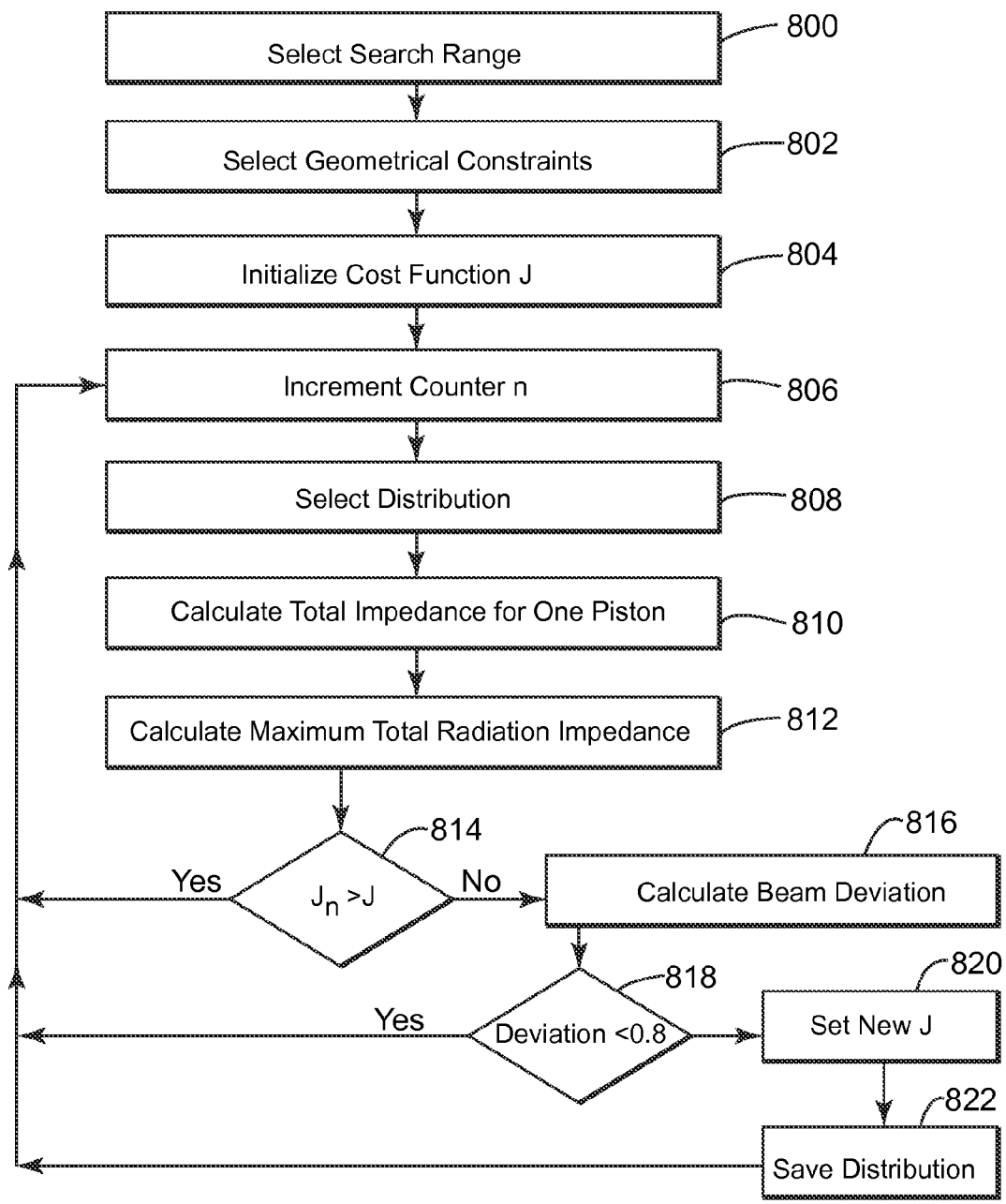
FIG. 8 is a flowchart of a method for optimizing a source array's source elements distribution according to an exemplary embodiment.
Figure 9:
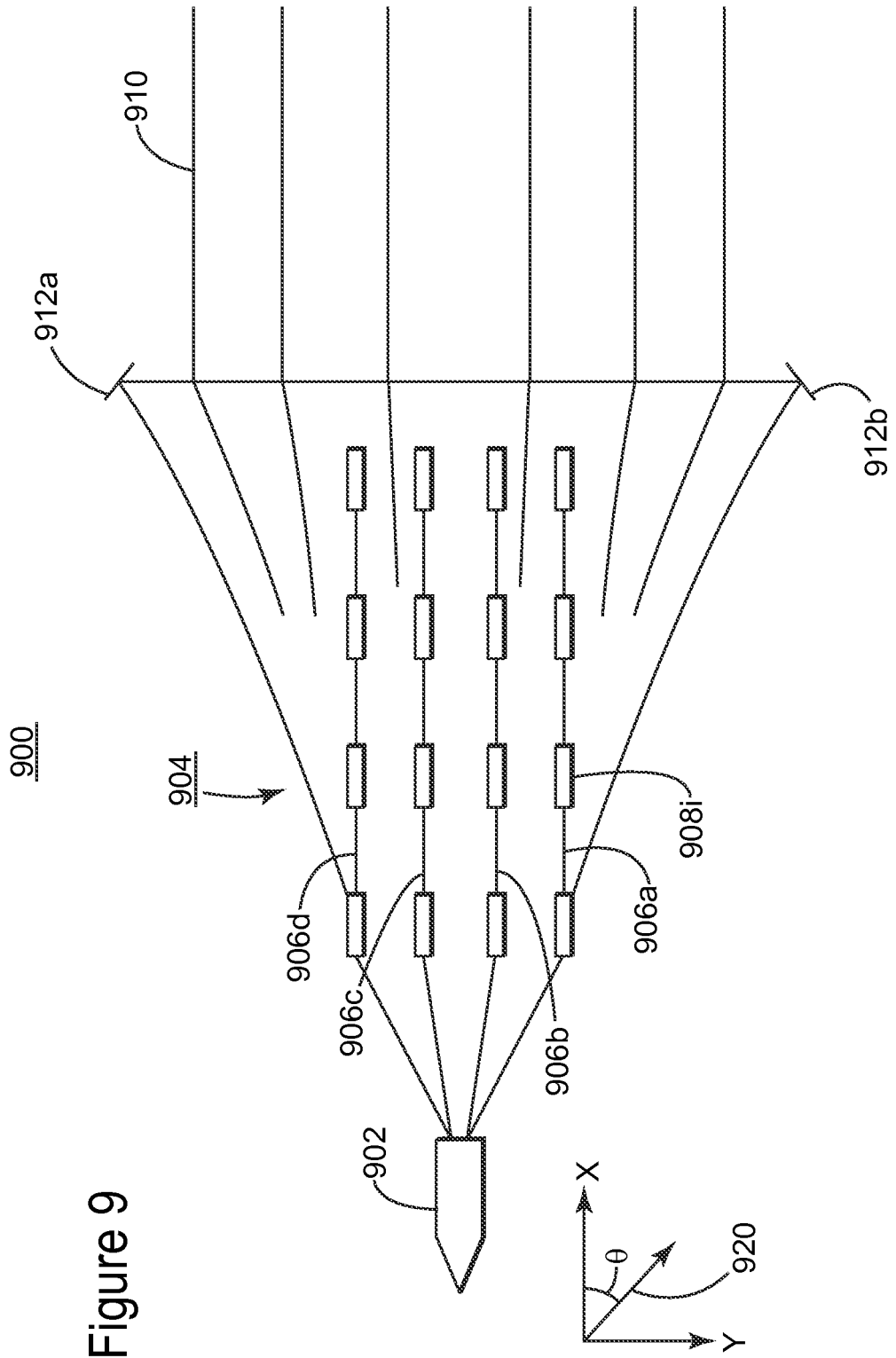
FIG. 9 is a top view of a seismic survey system having the source elements optimized according to an embodiment.

The process discussed in FIG. 8 has been used to calculate various source elements distributions for plural source arrays. In the following, two source arrays are discussed for exemplifying the power of the novel process. The following conventions are considered for both examples. FIG. 9 illustrates a seismic survey system 900 including a vessel 902 that tows a source array 904 and plural streamers 910. Source array 904 includes four towed lines 906a-d, each having source elements 908i. Two deflectors 912a and 912b pull apart the streamers 910's heads for maintaining a desired separation between them. The inline direction corresponds to the X axis and the cross-line direction corresponds to axis Y. The Z axis describes the depth. A vector 920 in the XY plane is described by azimuth angle theta, and an angle between any vector and the Z axis is described by the vertical or elevation angle phi.

A low-frequency source array is chosen to have the following constraints: the number of towed lines is four, each vibrator has two pistons that are axially separated by a distance of about 2 m, the source elements in a same towed line are at a same depth, the vibrators are towed with their central axis in line with the tow direction, all source elements are identical and operating with the same amplitude and phase, the source array was constrained to be symmetrical in both inline and cross-line directions; the tow depth is between 19 and 27 m; the source array length is equal to or smaller than 50 m, and the source array width is equal to or smaller than 50 m; the far-field signal beam deviation has less than 20% variation in beam strength for vertical angles less than 30 degrees and azimuth angle in the range of +/−45 degrees. The algorithm was run a million times and the results are illustrated in FIGS. 10-13b.

Figure 10:
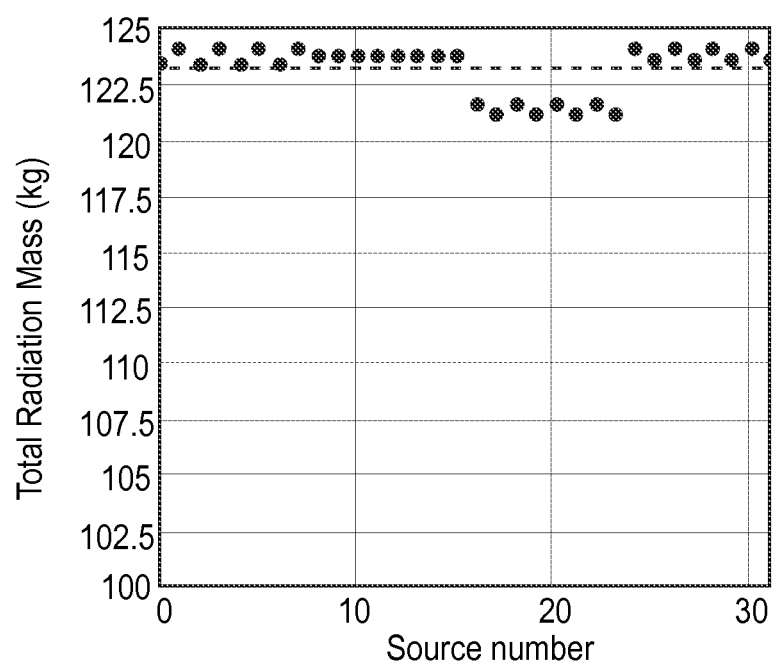
FIG. 10 is a schematic diagram of another source array for which the source elements distribution was calculated to maximize an output according to an embodiment.
Figure 11B:
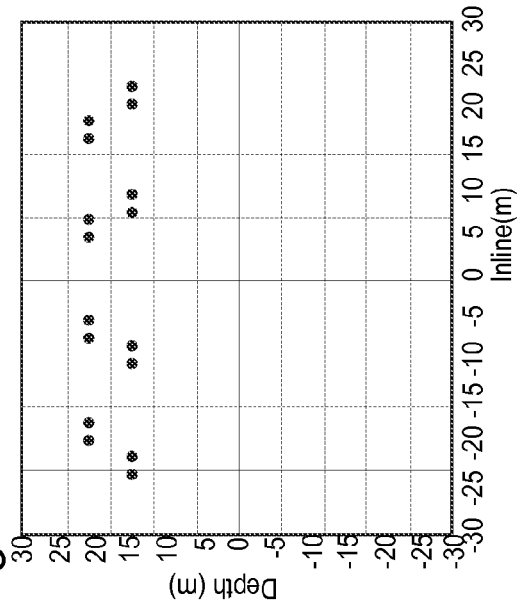
FIGS. 11A-C illustrate the source elements distribution in various planes according to an embodiment.
Figure 11A:
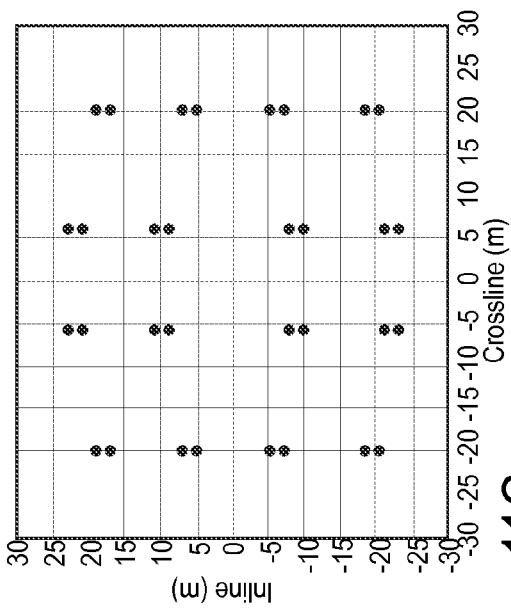
Figure 11C:
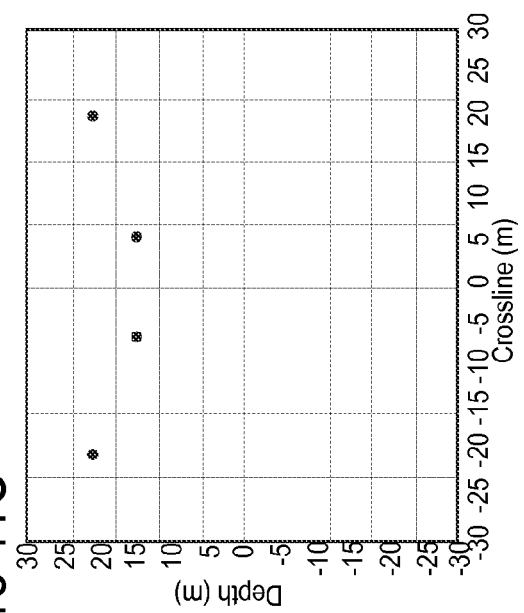
Figure 12:
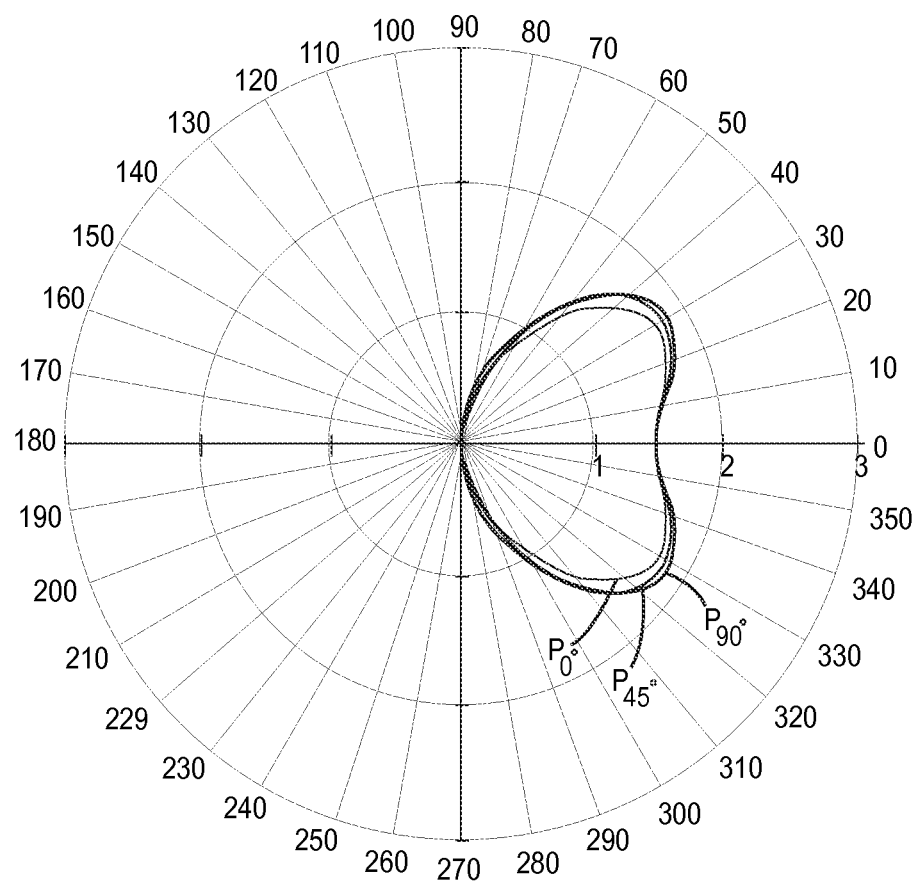
FIG. 12 illustrates the source array response at various azimuths according to an embodiment.
Figure 13A:
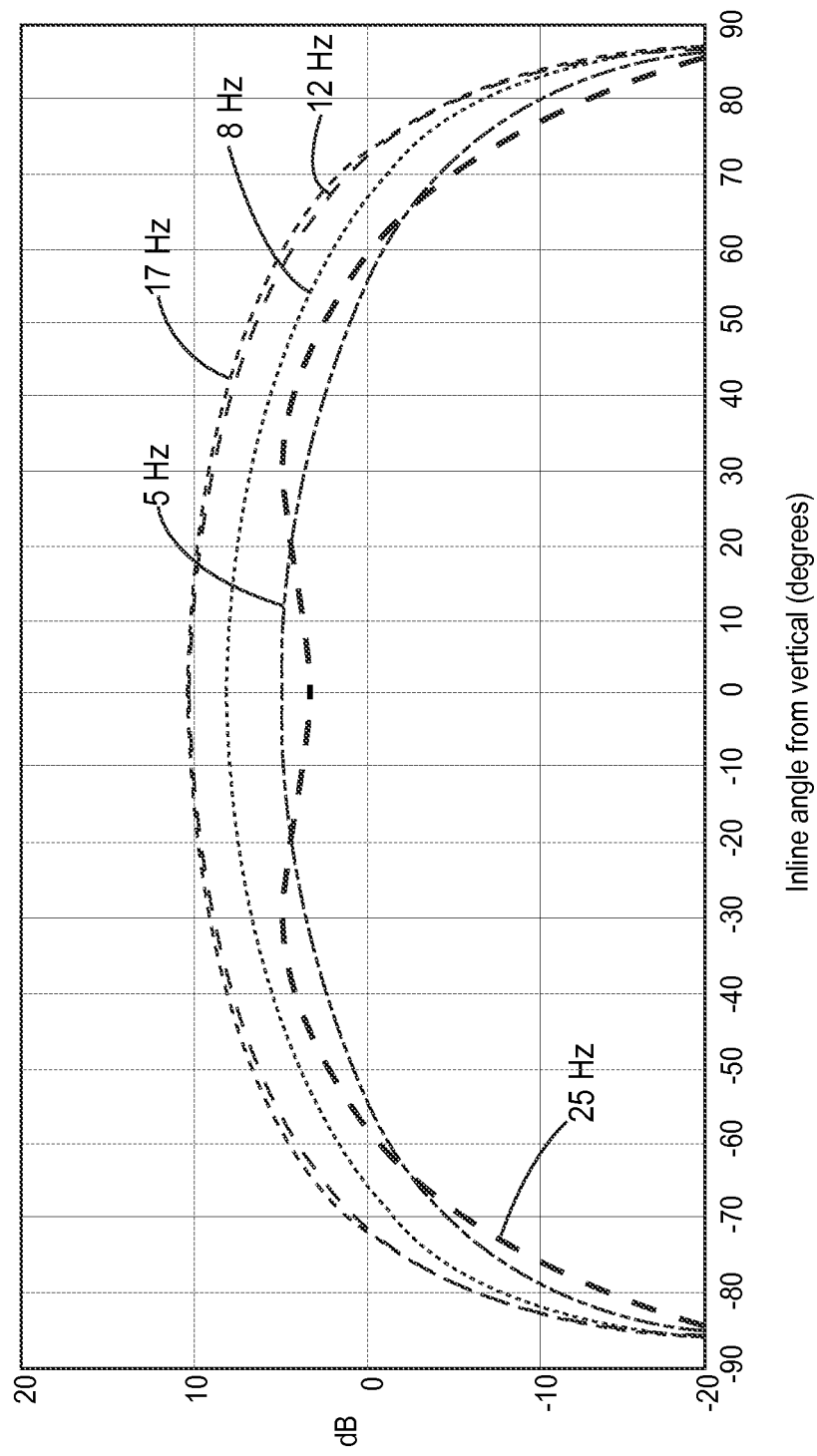
FIGS. 13A and 13B illustrate an amplitude versus vertical angle response for various frequencies, in an inline and cross-line direction, respectively, according to an embodiment.
Figure 13B:
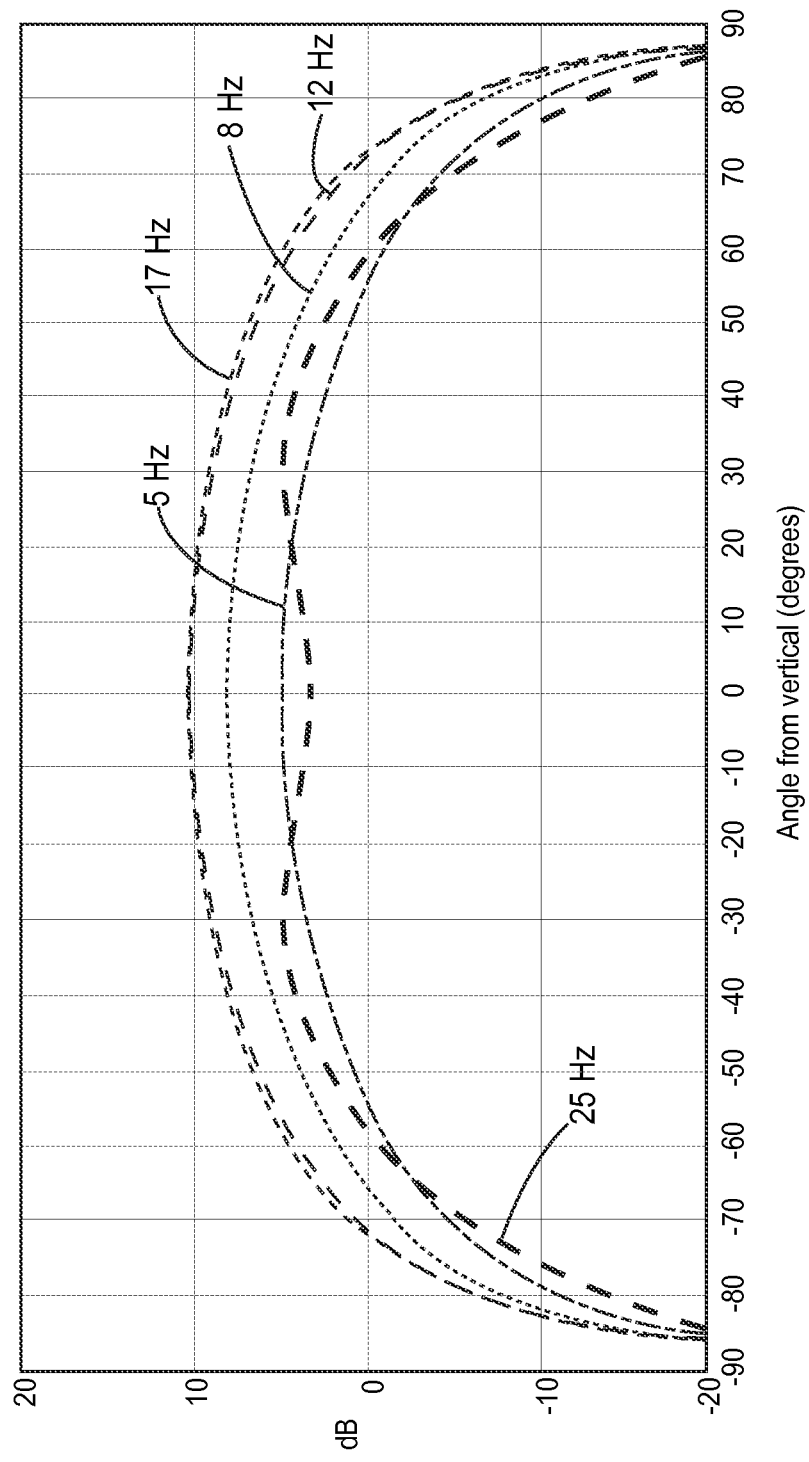

FIG. 10 illustrates the total radiation mass for each source element piston after applying the process described in FIG. 8. FIG. 10 shows that the radiation mass for all source elements is well-balanced at an acceptable maximum loading value. Note that the load on each source element is greater when the source elements are spaced closely together, i.e., much less than a wavelength apart. If the source elements are far away from each other, the load on one piston generated by the other pistons may not be significant. A corresponding source elements distribution has been found as illustrated in FIGS. 11A-C. FIG. 11A illustrates the positions of the source elements in the source array in the XY plane, FIG. 11B illustrates the positions of the source elements in the XZ plane, and FIG. 11C illustrates the positions of the source elements in the YZ plane. Note that FIGS. 11A-C are at scale and, thus, FIG. 11C shows the inside source elements being towed at 25 m depth and the outside source elements at 27 m depth. FIG. 12 is a polar plot with a linear amplitude scale that illustrates the source array response at 25 Hz versus the vertical angle for azimuth zero (see $P_0$), 45 (see $P_{45}$) and 90 degrees (see $P_{90}$). The amplitude for elevation angles less than 30 degrees is almost constant for the various azimuths. FIG. 13A shows the inline response versus vertical angle for various frequencies, and FIG. 13B shows the cross-line response versus the same vertical angle for various frequencies.

A high-frequency source array that utilizes vibrators equipped with smaller diameter pistons than the previously discussed low-frequency array is selected to have the following constraints: the number of towed source lines is three; each towed source line has six vibrators; each vibrator has two pistons with an axial spacing of about 1.5 m; the vibrators are towed with their central axis perpendicular to the tow direction; all source elements in a line are at a same depth; all source elements are identical and have the same amplitude and phase; the source array is symmetrical in both X and Y directions; the tow depth is between 3.5 and 5.5 m; the source array length and width are smaller than 8 m; the far-field signal beam shape has less than 20% variation in beam strength for vertical angles less than 30 degrees and azimuth angle in the range of +/−45 degrees; and four millions runs have been performed.

Figure 14:
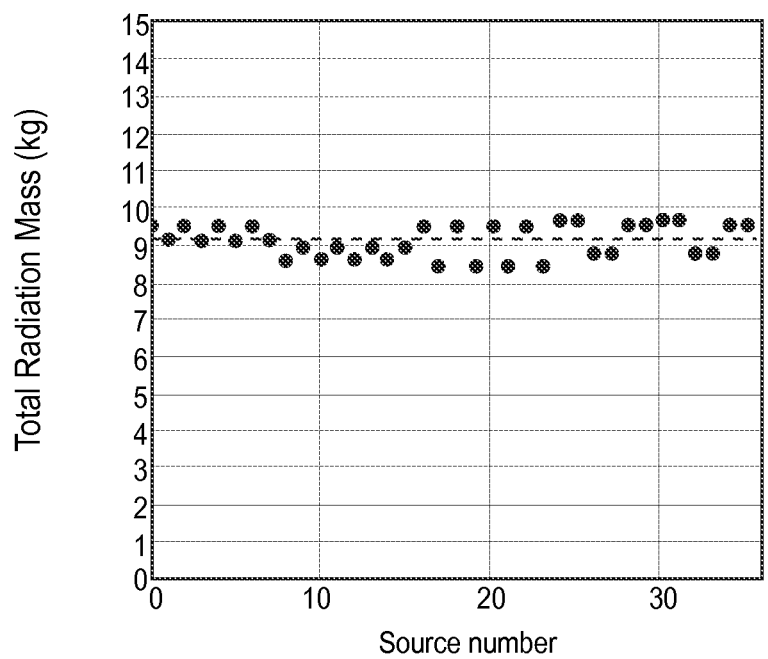
FIG. 14 is a graph of a total radiation mass calculated for a high-frequency source array according to an embodiment.
Figure 15A:
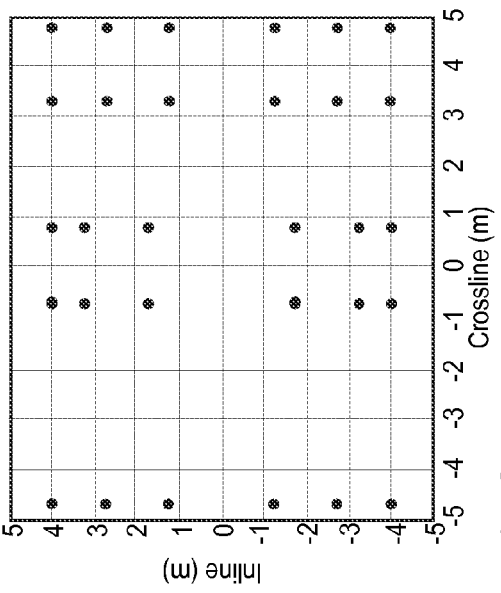
FIGS. 15A-C illustrate the source elements distribution in various planes according to an embodiment.
Figure 15B:
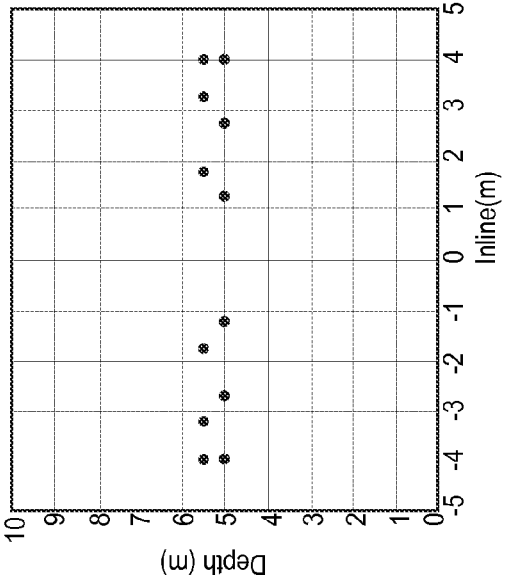
Figure 15C:
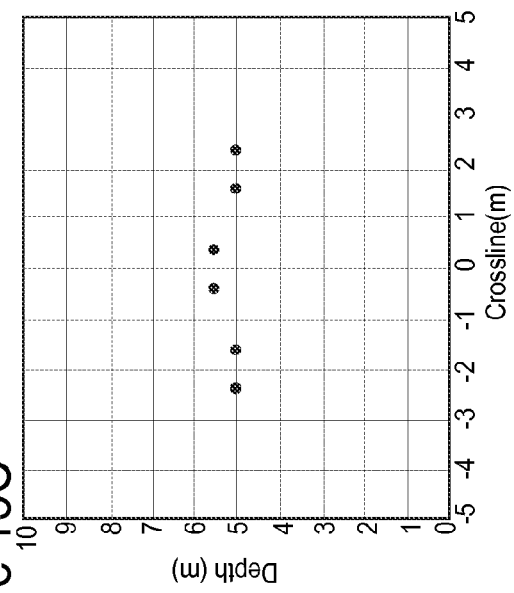
Figure 16:
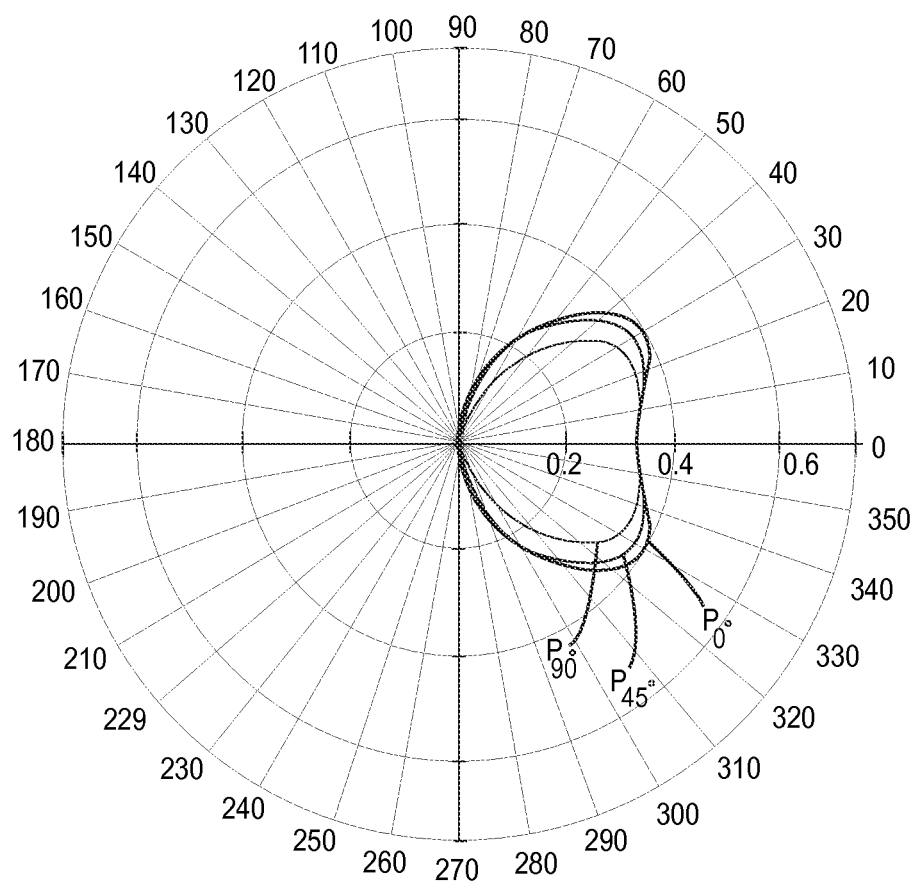
FIG. 16 illustrates the source array response at various azimuths according to an embodiment.
Figure 17B:
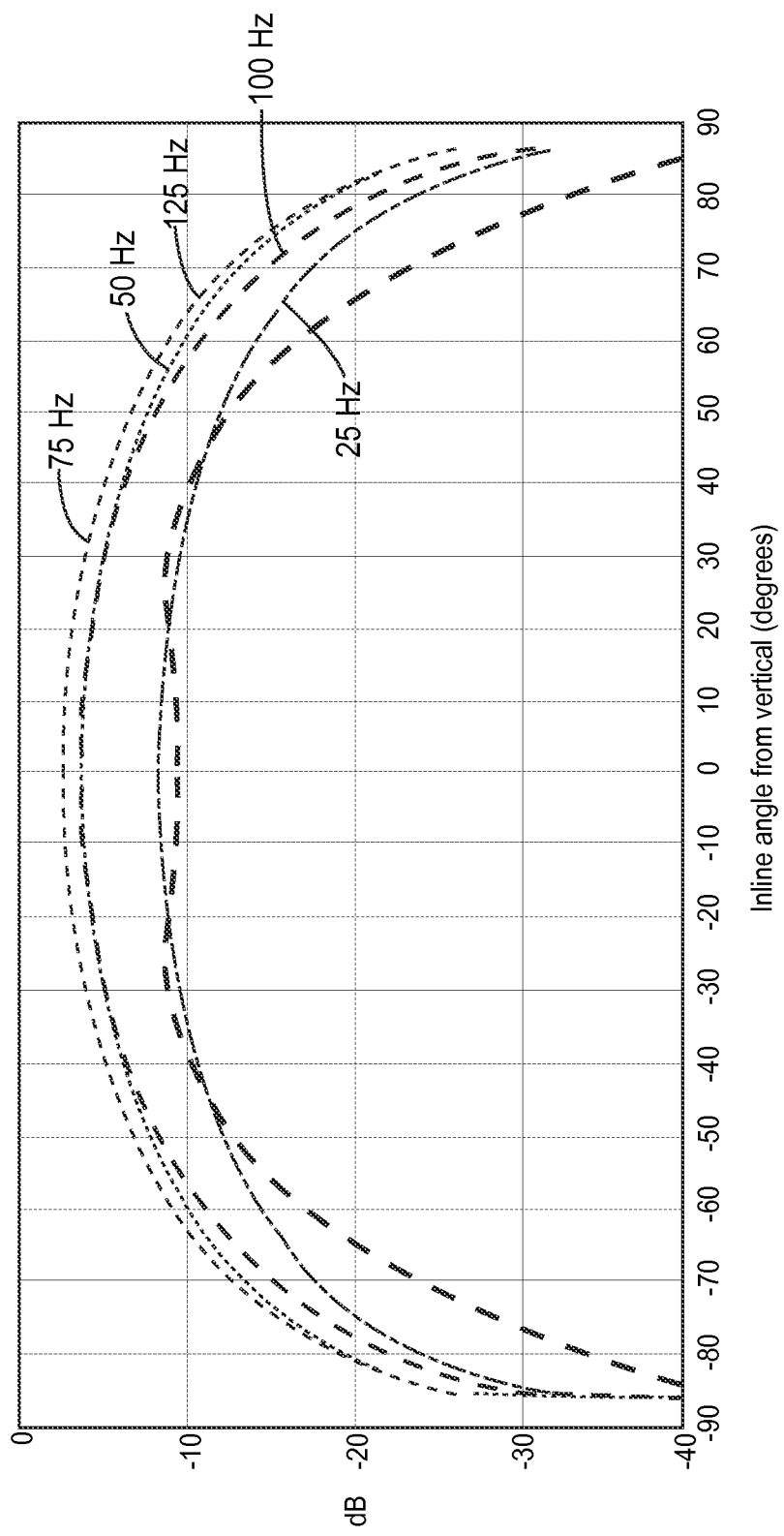

After running the process illustrated in FIG. 8 for the high-frequency source array having the constraints noted above, the following results are obtained. FIG. 14 illustrates the total radiation mass for each source element piston after applying the process described in FIG. 8. This means that a source element distribution has been found as illustrated in FIGS. 15A-C. FIG. 15A illustrates the positions of the vibrator pistons in the source array in the XY plane, FIG. 15B illustrates the positions of the vibrator pistons in the XZ plane, and FIG. 15C illustrates the positions of the vibrator pistons in the YZ plane. Note that FIGS. 15A-C are at scale and, thus, FIG. 15C shows the inside source elements being towed at 5.5 m depth and the outside source elements at 5 m depth. FIG. 16 is a polar plot with a linear amplitude scale that illustrates the source array response at 125 Hz versus the vertical angle for azimuth zero (see $P_0$), 45 (see $P_{45}$) and 90 degrees (see $P_{90}$). The amplitude for elevation angles less than 30 degrees is almost constant for the various azimuths. FIG. 17A shows the inline response versus vertical angle for various frequencies, and FIG. 17B shows the cross-line response versus the same vertical angle and various frequencies. Note that because the piston diameters are less than for the low-frequency array, the radiation mass is much less.

Although not illustrated, the FIG. 8 process may be applied to a source having both high- and low-frequency source arrays. The process used for the above calculations assumed that the source elements pistons have the same velocity amplitude, that all vibrators had the same piston size and same drive mechanism, and that all pistons are in phase with one another or their phase relationships are known. An improvement of this process may consider that all pistons do not have the same amplitude. For this application, a step of computing the mutual impedance term for each active piston is added followed by a step of computing the maximum piston velocity that each actuator might be able to generate for that radiation loading at the frequency of interest based upon stroke, electrical current, voltage or other source limitations. Using the new piston velocities, then update the mutual impedances. If this approach is followed, it will lead to different amplitude spectra for each actuator, and in the field it might require the use of multiple pilot reference signals. The issue of whether or not the added boost in array output (if any) justifies the added complexity can be decided on a per-case basis.

Another improvement may be achieved by including the effect that depth has on the source element cabinet air-spring resonant frequency. Thus, in addition to looking at beam shape as a constraint, one might compute the mass-cabinet air-spring resonant frequency for each piston, and possibly require that all resonant frequencies fall within a prescribed range to ensure that all actuators have similar responses.

The algorithm discussed above may be extended/modified/adapted to address other matters related to a source array having vibratory source elements. For example, such a source array may be controlled in a way that produces a "phased" or "beam steered" array. Because many areas have been surveyed before, there is often a lot of prior knowledge about a survey prospect, for example, the presence/location of salt domes. Ordinarily, marine vibrators are all operated synchronously (in phase with one another), and the source array dimension is small to avoid directivity notches in particular directions for frequencies of interest, with the objective of the source array uniformly illuminating the target area. However, in some instances, when trying to image steeply dipping events, for example, salt domes, the acoustic wave front may tend to impinge on the flanks of the salt dome at a grazing angle (away from normal incidence with respect to the reflection boundary) so that little energy is reflected back toward the surface where receivers (towed hydrophone or multi-component streamers) are located and energy is radiated in other directions that may create unwanted backscatter. One solution might be to operate at longer offsets, but this creates its own problems, for example, sound levels will drop with offset due to spreading losses. The result is that steeply dipping events create special imaging challenges.

For these situations, it may be advantageous to steer source array emissions so that the acoustic wave front they generate impinges on the salt dome's flanks at an angle closer to normal incidence. One way to change the source array's directivity pattern is to operate multiple source elements at the same phase, but have them operate at different depths. This creates a tilted acoustic wave front; its main lobe attains a maximum at an angle away from vertical. Deploying source elements at multiple depths may create towing problems and, because the source elements are at different depths, different hydrostatic pressures will act on them that create unwanted complexity. As an alternative, source elements operating at approximately the same depth can be phased differently. The result is that the source array's directivity pattern can be tilted to approximate the same pattern as sources operating synchronously at different depths. Phasing can be just a time delay, but because of the surface ghost contribution, in practice, the phasing scheme may be more complicated. Because their relative phase and spacing affects the mutual impedance between sources, cost function J discussed above with regard to FIG. 8 would need to be modified to incorporate this effect as well.

Another factor that can change source array directivity patterns is source element amplitude. While it is ordinarily desirable to operate all source elements at their maximum output, it is anticipated that in some situations it might be desirable to have the output of at least one source element different than the others. The difference in amplitude could be invariant with frequency or change with frequency. For example, a special case might be to use variable amplitudes to tune out the direct arrival (horizontally propagating) energy from the source array that impinges on the near offset streamer hydrophones (see, for example, Sallas, U.S. Pat. No. 4,918,668, the entire content of which is incorporated herein by reference). Thus, this constraint could also be incorporated into cost function J as part of the target directivity pattern.

One example of how to steer a source array beam for achieving a desired directivity is now discussed. The beam-steering process can also be used to create ghost notch diversity. For example, in marine acquisition, spectral notches in down-going acoustic energy can occur in the amplitude spectrum of conventional constant depth source arrays due to the effect of destructive interference with the surface reflection. Dual-depth or variable-depth source streamers provide means to counter this effect. One option is a towed curved array. Because the sources are located at different depths, reflections will constructively and destructively interfere, causing spectral notches to be filled in when compared to constant depth arrays.

Thus, the algorithm discussed next can be applied not only for beam-steering purposes, but also for filling spectral notches in the source array output. For simplicity, the beam-steering process discussed now is implemented using a curved array with beam form filters. The process may be adapted to use phase steering or amplitude steering.

Figure 18:
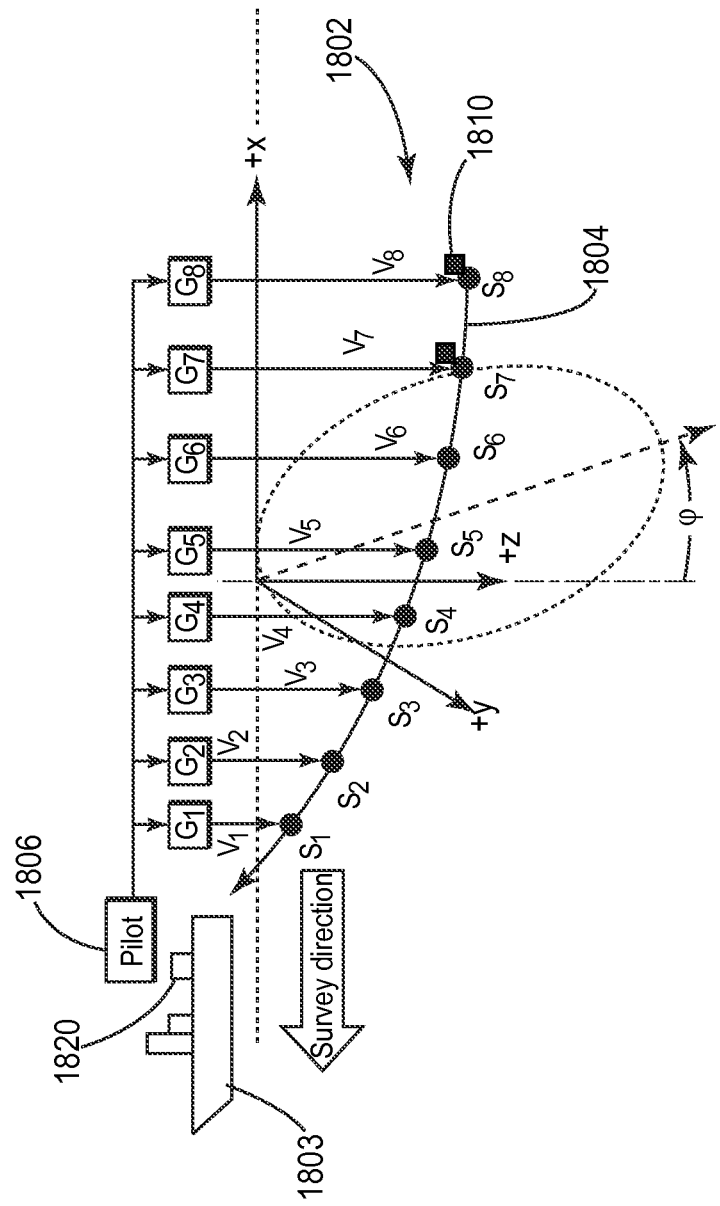
FIG. 18 illustrates a seismic survey system having multiple source elements, each having a beam form filter for steering a source array beam according to an embodiment.

With regard to FIG. 18, a source array 1800 includes at least one source sub-array 1802 having plural source elements S1 to S8 towed by a vessel 1803. Source elements S1 to S8 are distributed along a curved line 1804, which may be a parameterized curve. A pilot signal 1806 that can be a conventional swept sine over a predetermined frequency range or some other excitation signal, for example, a band-limited pseudorandom signal, can be convolved with beam form filters G1 to G8 (to be calculated by a process disclosed next) to form drive signals V1 to V8. The pilot signal and the beam form filters may be processed in a controller 1820 on the vessel or a distributed controller that has some parts on the actual source elements. These signals are stored in the memory of the source controllers 1810, which are located at the source elements, on the vessel in controller 1820, or distributed between the source elements and the vessel. Upon receiving a command from the vessel's seismic data acquisition management system 1820, sources S1 to S8 emit an acoustic signal using a feedback control system to emit acoustic energy that tracks drive signals V1 to V8. In other words, the acoustic emissions of source elements S1 to S8 have the same amplitude and phase spectra as the drive signals V1 to V8 that are used as reference signals by the respective source elements S1 to S8 source controllers.

Beam form filters G1 to G8 are designed to adjust the pilot signal phase and/or amplitude to ensure that acoustic energy radiated by the source array is maximized in a preferred direction over a frequency band of interest. In FIG. 18, this preferential angle is the vertical angle φ over a range of azimuths. Not shown is the azimuth angle θ which is useful for describing the beam width.

Source array performance can be optimized, subject to given constraints. In other words, an iterative search procedure can be implemented that finds filters G1 to G8 to form the beam over a range of frequencies given a certain source geometry, and calculates a performance index for that geometry. Then, the candidate source positions are changed and a new set of filters is found. The performance index for that geometry is calculated and compared to previous candidate performance. After either the desired target performance index is achieved or a best choice for a pre-determined number of loop iterations is found, the filters G1 to G8 and the corresponding source geometry are made available for download into the seismic survey system.

Figure 19:
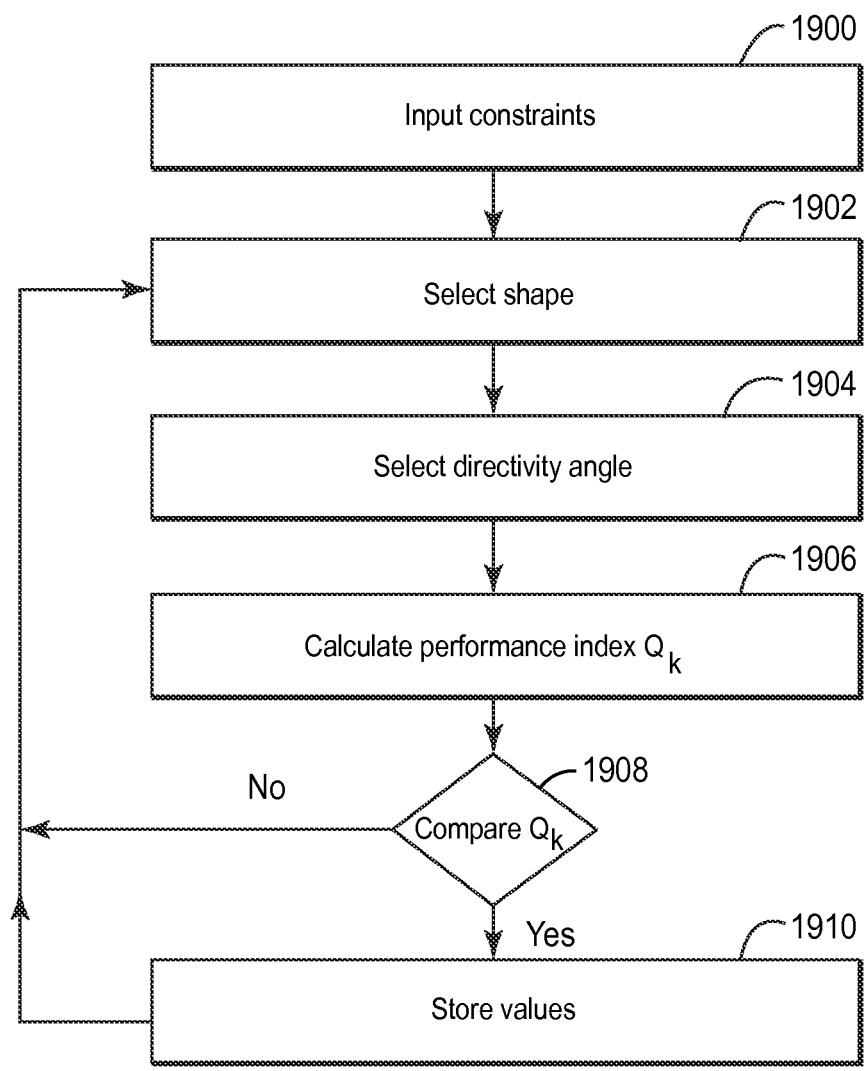
FIG. 19 is a flowchart of a method for steering a beam according to an embodiment.

This process is now discussed in more detail with regard to FIG. 19. In step 1900, various constraints related to the geometry and size of the source array are entered. For example, these constraints may include a number Ns of the real source (actual) elements, Fmin, which is a minimum frequency of interest, Fmax, which is a maximum frequency of interest, Zmin, which is a minimum source element depth, Zmax, which is a maximum source element depth, Lmin, which is a minimum source array length, Lmax, which is a maximum source array length, and $\alpha_1$ and $\alpha_2$, which define the beam azimuth angle range.

In step 1902, a shape of line 1804 may be chosen. For example, for simplicity, a sinusoid shape (a portion of a sine wave) is chosen for line 1804. Other parameterized curves may be selected. Alternatively, no shape may be selected and, thus, the process itself will determine the location of the source elements based only on the constraints entered in step 1900. Then, in step 1904, a directivity angle φ is selected so that the algorithm maximizes the output of the source array for the selected directivity angle φ over the frequency range of interest and over a range of azimuth angles as noted in step 1900.

If the source elements are spaced uniformly in the X direction, and the last element in the source array (or sub-array) is the most distant from the vessel and the deepest, then the X and Z positions of the nth source element are given by:

$$X_n = -\frac{L}{2} + n(L N_s), Y = 0,$$

and $$Z_n = Z_{N_s} \sin\{(\pi/2)(n+a-1)/(N_s+a-1)\},$$

where "a" is a coefficient determined by the number of sources and the minimum and maximum candidate distribution source depths. The calculation of "a" is described below with reference to equation (6).

Depth $Z_1$ of the shallowest source element is given by $Z_1 = Z_{N_s} \sin\{(\alpha\pi/2)/[2(N_s+\alpha-1)]\}$. Only four parameters are necessary to determine the position of all source elements. These parameters are $N_s$, L, $Z_1$ and $Z_{N_s}$, with source element S1 at position (−L/2, 0, $Z_1$) and source element $S_{N_s}$ at position (+L/2, 0, $Z_{N_s}$). By constraining the shape of the towed sub-array, it is possible to reduce the number of parameters needed to define the positions of the source elements and this greatly reduces the size of the parameter space to be searched. If $Z_1$ is chosen to have a given value, then parameter "a" may be calculated as follows, where function a sin( ) is the arcsin function:

$$a = \frac{(N_s - 1) \cdot \operatorname{asin}\left(\frac{Z_1}{Z_{N_s}}\right)}{\pi - 2 \cdot \operatorname{asin}\left(\frac{Z_1}{Z_{N_s}}\right)}. \tag{6}$$

Figure 20:
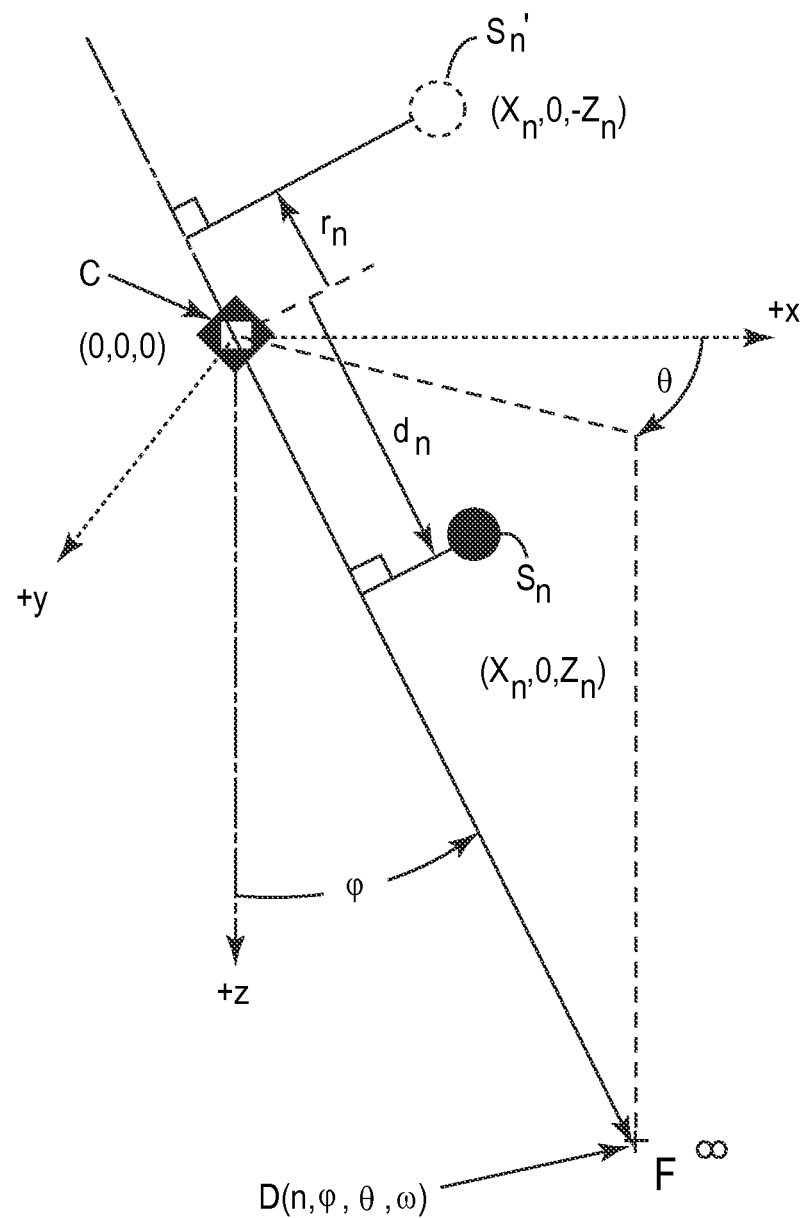
FIG. 20 schematically illustrates a source element and its associated ghost source element according to an embodiment.

An overall performance index $Q_k$ is calculated in step 1906 as follows. An effective center C of the array (or sub-array) of real and virtual sources is assumed to be at the waterline as illustrated in FIG. 20. FIG. 20 shows a single source element $S_n$ and its corresponding virtual source (or notional source) $S_n'$. A virtual source is considered to be the mirror image of the real source when the mirror surface is considered to be the water surface. The virtual source is introduced to account for the ghost introduced by the reflective property of the air-water interface, which is known to reflect seismic waves trying to escape the water. Center C of the array may be the geometrical center of the source elements if the source elements are identical. Other measures may be used for defining the array's center. In this embodiment, center C is considered to be located at the origin of the XYZ system of reference. Consider D(n, $\phi$, $\theta$, $\omega$) to be the far-field contribution of source element $S_n$ and its ghost $S_n'$ at vertical angle $\phi$, azimuth $\theta$, for a natural frequency $\omega$ and ignore the spreading loss. Then, in the frequency domain, the far-field contribution can be expressed as:

$$D(n,\phi,\theta,\omega) = G(n,\omega) \cdot \{e^{j\omega d_n/C} - e^{j\omega r_n/C}\}, \tag{7}$$

where G is the beam form filter, $d_n$ is the orthogonal projected distance of $S_n$ along the ray path from C to an imaginary point F at infinity where the far-field signature is calculated, and $r_n$ is the orthogonal projected distance of the notional source $S_n'$ along the ray path from C to the imaginary point F. Thus, $d_n$ is given by:

$$d_n = X_n \sin(\phi)\cos(\theta) + Z_n \cos(\phi) \tag{8}$$

and $r_n$ is given by:

$$r_n = X_n \sin(\phi)\cos(\theta) - Z_n \cos(\phi). \tag{9}$$

If A($\phi$, $\theta$, $\omega$) is the total far-field combined output of the source array at vertical angle $\phi$, azimuth angle $\theta$ and natural frequency $\omega$, i.e., the sum of the contributions from $S_1$ to $S_{Ns}$ and their surface reflections, then $$A(\phi,\theta,\omega) = \sum_{n=1}^{Ns} D(n,\phi,\theta,\omega). \tag{10}$$

Next, the values for the filters $G_1$ to $G_{Ns}$ are computed based on equation (10) for each frequency. In practice, a set of discrete frequencies are selected and the filters for this frequency set are calculated, and then the values for the filters for other frequencies are interpolated from the calculated filter values. In other words, suppose that the frequency band of interest is 10 to 30 Hz and the frequency subset includes discrete frequencies 10, 16, 20, 25 and 30 Hz. Then, the performance index is calculated only for these discrete frequencies, to provide a solution for filters $G_1$ to $G_{Ns}$. For all other frequencies emitted by the source array in the band of 10 to 30 Hz, the values for filters $G_1$ to $G_{Ns}$ are calculated by interpolation or other equivalent mathematical process. The frequency band and discrete frequencies noted above are only exemplary and not intended to limit the invention. The interpolation operation assumes that the G functions have smooth transitions. Thus, the G function for a given frequency $\omega$ and a given source element n is given by:

$$G(n,\omega) = B(\omega)e^{+j[\omega(\tau_n) + \Theta(n,\omega)]} \tag{11}$$

where B($\omega$) is an amplitude level which is non-zero and real, $\tau_n$ is a time advance, and $\Theta$(n, $\omega$) is an added phase perturbation function. $\Theta$(n, $\omega$) is assumed to smoothly vary with frequency, so that it could take the form of a polynomial like a quadratic whose coefficients $k_2$, $k_1$ and $k_0$ are to be solved such that $\Theta$(n, $\omega$)<$\pi$. If a mixture of source models were to be deployed with different output levels and/or were to be operated over different frequency bands that were a subset of Fmin to Fmax band, that information may be included in the amplitude level term B($\omega$).

The overall performance index $Q_k$ for the kth source geometry candidate may take the following form:

$$Q_k = \sum_{m=1}^{Nf} |\hat{A}(\phi,\omega_m)|^2/[1+\lambda P(\phi,\omega_m)] \tag{12}$$

where $|\hat{A}(\phi, \omega_m)|$ is the mean magnitude of the far-field output in the $\phi$ direction averaged over the azimuth angle range $\alpha_1 < \theta < \alpha_2$ using the beam form filters G that maximize the average output over the azimuth angle range in the $\phi$ direction at discrete frequency $\omega_m$, and P($\phi$, $\omega_m$) is a penalty function that is discussed next. Note that the performance index $Q_k$ is summed over a given number of frequencies $N_f$. This number may vary from survey to survey depending on the needs of the survey. Note that the performance index may be defined to take another form.

In one application, the penalty function P($\phi$, $\omega_m$) may be used, with 0<P($\phi$, $\omega_m$), to introduce other problem constraints. For example, the penalty function can be used to ensure there are no spectral notches in the output at particular frequencies, and/or that the source elements are not over- or under-driven, and/or the array length is not too large, and/or the array depth is not too deep. Parameter $\lambda$ is a weighting parameter having a value equal to or larger than zero. Thus, when the value is zero, the penalty function has no effect. As parameter $\lambda$ is increased, the penalty function has a greater impact on the final outcome of the candidate source elements distribution.

Then, in step 1908 a decision is made whether the found candidate source elements distribution is appropriate. If the answer is yes, the values of the performance index, the candidate source elements distribution and the beam form filters are stored in step 1910 in a memory device. Optionally, the process may return to step 1902 for finding an even better distribution. If the answer is no, the process automatically returns to step 1902 for finding another distribution.

To facilitate the acquisition process, tables of beam form filters for various beam shapes could be computed beforehand and their values stored and catalogued in a filter library onboard the vessel computer system. As the seismic survey progresses, if it is found necessary to change the beam shape, filters from the library can be accessed in computer memory and downloaded into the source array controllers as the need arises.

Figure 21:
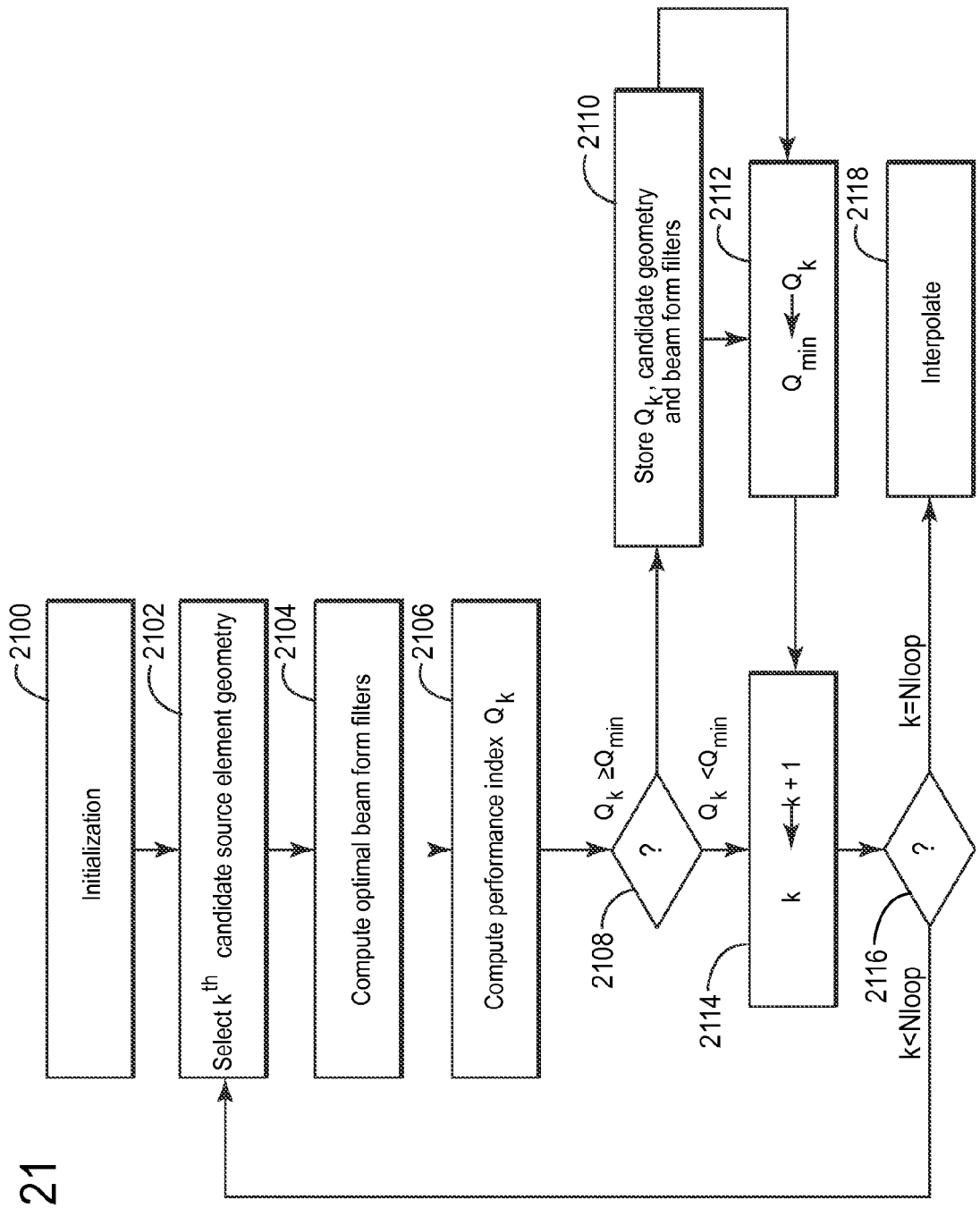
FIG. 21 is a flowchart of a process for determining beam form filters to be applied to source elements according to an embodiment.

The above-discussed method may be implemented in a controller, as discussed next, located on the vessel or on shore, for forming a beam that achieves a desired total far-field output. With regard to FIG. 21, the implementation includes a step 2100 in which the controller is initialized. This step may include, for example, setting a number of loops to run for the best source elements distribution, setting an index k, initializing a minimum acceptable performance index Qmin, etc. Then, in step 2102, a source elements distribution (geometry) is selected and optimal beam form filters are computed in step 2104, for example, based on equations (9) and (10). In step 2106, the performance index $Q_k$ is calculated, for example, based on equation (11). The result of this step is compared in step 2108 with a given value $Q_{min}$. If the computed value $Q_k$ is greater than $Q_{min}$, then $Q_k$, the considered geometry of the source elements and the calculated beam form filters G are stored in a memory in step 2110. The process may then be repeated for a new geometry (source elements distribution) after $Q_{min}$ is updated in step 2112 and index k is increased in step 2114. In step 2116, it is verified that the loop number is still smaller than a given loop number Nloop. If the result is yes, the process returns to step 2102 for selecting another candidate and repeating the above-noted steps. If the result is no, the process is terminated but not before calculating in step 2118 the value of $Q_k$ for other frequencies than those noted in equation (12). This step may include an interpolation procedure for calculating performance index for a frequency $f_a$, which lies between frequencies $f_i$ and $f_{i+1}$ used in equation (12). These results are also stored in the memory.

Figure 22:
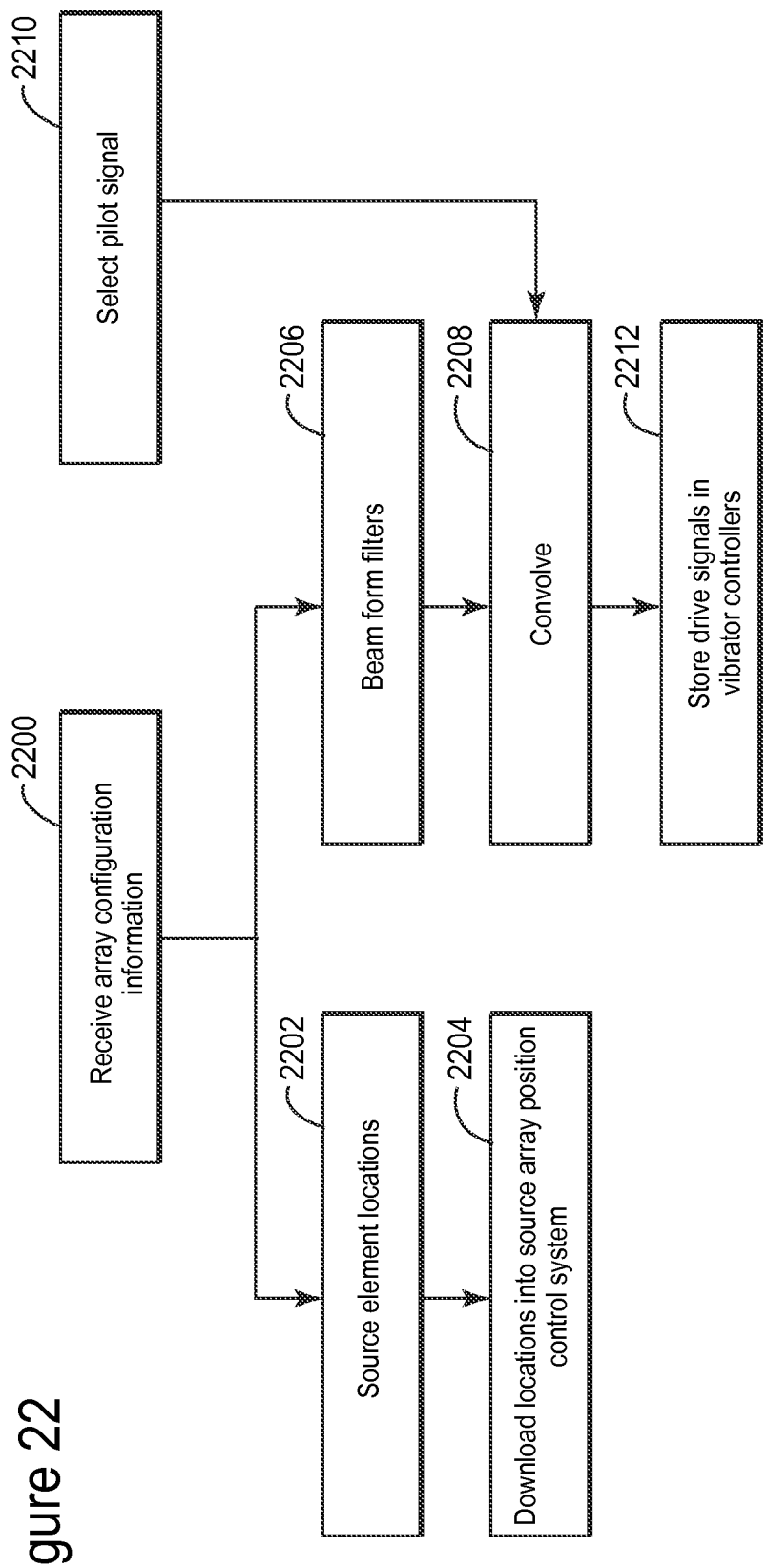
FIG. 22 is a flowchart illustrating how to calculate and apply beam form filters to source elements according to an embodiment.

Having determined the source elements distribution that best achieves the desired far-field output, the controller may implement the following process illustrated in FIG. 22. In step 2200, the controller noted above or another controller receives the array configuration information, i.e., the source elements distribution. This may include the X, Y and Z position for each source element of the source array as noted in step 2202. This information is sent in step 2204 to a source array position control system, which may be controller 720 or any other controller. Then, the controller implements these positions by adjusting a winch, a wing, a vane or other position control device, for achieving the source elements' desired positions, for example, during the seismic survey, or when the seismic survey is stopped.

The controller may also receive in step 2200 the beam form filters 2206 (calculated as illustrated in FIGS. 19 and/or 21), which are convolved in step 2208 with a pilot signal 2210 to form in step 2212 the drive signals, which are stored in the vibrator controllers. Then, when the calculated geometry of the source array is achieved by the source array position control system, and the newly calculated drive signals of the source elements are ready in the source elements controllers, the controller instructs the local controllers to drive the source elements to obtain the desired beam shape.

Figure 23:
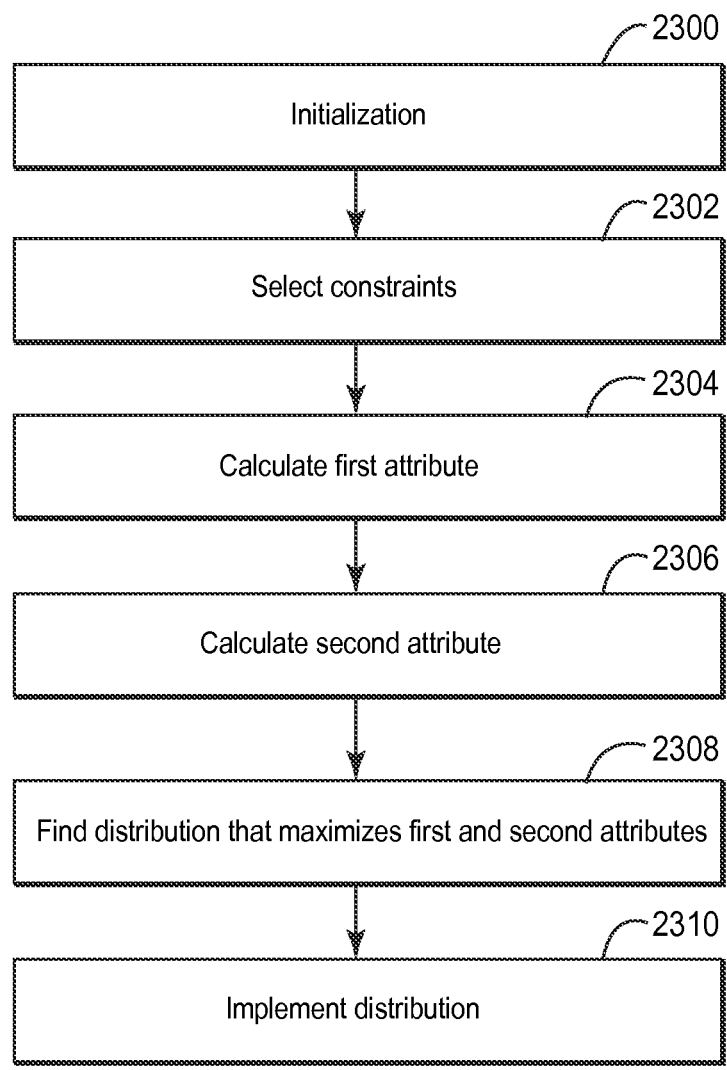
FIG. 23 is a flowchart of a method for finding a source elements distribution that achieves a desired load impedance and a beam shape according to an embodiment.

The processes discussed above with regard to FIGS. 8 and 19 may be merged to achieve a certain load distribution for each source element and a given beam shape for the entire source array. In other words, the process discussed with reference to FIG. 8 is designed to achieve a desired load distribution for each source element while the process discussed with reference to FIG. 19 is designed to achieve a desired beam shape for the entire source array. The two desired attributes (load distribution and beam shape) may be requested from a same source array. A process that achieves this goal is now discussed with reference to FIG. 23.

In step 2300, the process is initialized similarly to the processes discussed above with regard to FIGS. 8 and 19, e.g., a number of loops to be processed is given, one or more indices of the various constraints and/or attributes to be evaluated are given a starting value, etc. In step 2302 one or more constraints are selected. For example, the constraints may include a search volume in which the source array needs to fit, a number of lines that are towed, etc. A first attribute is calculated in step 2304, and this first attribute may be related to an acoustic radiation impedance per source element. A second attribute may be calculated in step 2306 and it may be related to a beam shape of the entire source array. In step 2308, a distribution of the source elements is found that optimizes (depending on the structure of the function to be optimized, this can be either a maximization of a performance index or a minimization of a cost function or some combination) the first and second attributes. In one application, the distribution maximizes one attribute and minimizes the other. Those skilled in the art would recognize that various optimization algorithms as known in the art may be used to solve these problems. In one application, the optimization is simultaneously applied to the first and second attributes, while in another application the optimization is applied sequentially to the selected attributes. More than two attributes may be used. Then, the found source elements distribution (for example source element positions and/or source element drive signal filters, etc.) is implemented in step 2310 for the source array used in the seismic survey.

The previous embodiments have been discussed, for simplicity, for source elements emitting the same frequencies, i.e., having the same size. However, it is possible to apply the methods discussed above to source elements distributed on a same towed line, but not emitting the same frequencies at the same time. This case may be treated as having two independent arrays. Thus, mutual impedance is not a real issue, since frequencies from one source array should be orthogonal with frequencies from the other source array at the same point in time, although some nonlinear effects may be present. For example, the small source elements, while trying to generate frequency F2, might see the pressure field created by the large source elements operating at frequency F1. Thus, if small and large source elements are too close to one another, there might be some intermodulation distortion produced in the smaller vibrators, i.e., some F2−F1 and some F2+F1 energy.

It is believed that this effect will be mitigated if the small source elements are at much shallower depth than the large source elements, because the large source surface ghost tends to cancel the contribution of the large source element as seen by the shallow small source element. This is so because the large source element ghost and the large source element will be nearly the same distance from the small source element, but opposite in polarity. Thus, if there are large and small source elements on the same towed curved line, it is possible to optimize these separately and to use one solution to limit the positions of the source elements allowed for the second solution.

Another situation is possible when small and large source elements work at the same frequency at the same time. The problem becomes that the mutual loading effect the large source element exerts on the small source element may actually exceed the self-radiation impedance of the small source. For example, if a small source element with a radiation mass of 30 kg (self-impedance) is near a large source element trying to deliver the same frequency at the same time, the mutual impedance effect from the large source element might create an added load on the small vibrator of 50 kg, which will overwhelm the small source element. Thus, one solution is to first ensure that the large and small source elements are not too close to one another, i.e., separate geometry constraints for the large source array and the small source array. For example, it is possible to define the range for each source array so the maximum depth allowed for the small source array is more than "B" meters away from the shallowest large source array, which essentially means that the small source elements are confined to 2-5 m depth and the larger source arrays are confined to 19-25 m, so "B," the minimum separation distance, would be B=14 m. Then, for the cost function, the process computes the maximum radiation mass seen by any element in the large source array, and the process also computes the maximum radiation mass seen by any element in the small piston array. The solution for the placement of large and small source elements is chosen to minimize the maximum radiation impedance of the large sources elements, provided that the maximum radiation impedance seen by any small source element does not exceed some amount which might require that the small source element be operated at reduced output (say 50%) to avoid overheating or overcurrent.

In a variation of the processes discussed above, it is possible while conducting the random search over candidate source locations, to keep some statistics, e.g., making a histogram and seeing how many solutions fall into different bins. In the end, it is possible to see how many other geometries have cost functions that lie close to what the process found over the first, e.g., 10 million trials. This information may be used to inform on how to adjust the grid size and localize the search. Those skilled in the art would appreciate that other search techniques may be used to reduce the time for finding a solution, or possibly to apply a gradient search technique.

Figure 24:
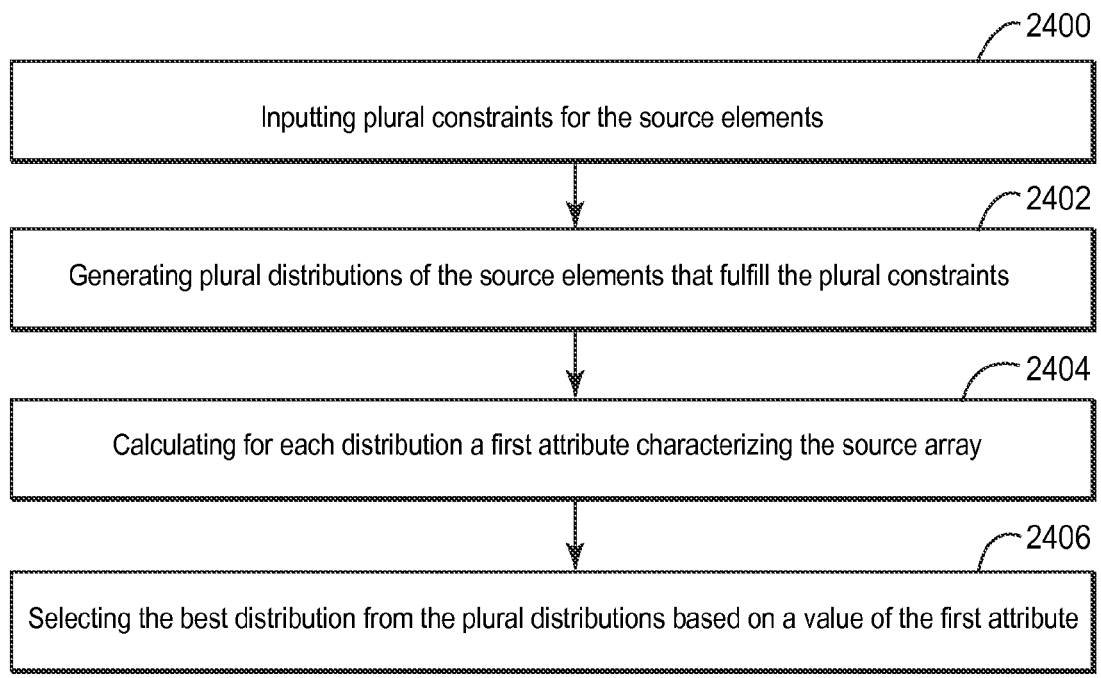
FIG. 24 is a flowchart of a method for finding a source elements distribution that achieves a desired load impedance according to an embodiment.

Two methods for optimizing source elements distributions are now discussed. According to an embodiment illustrated in FIG. 24, there is a method for finding a best distribution of source elements that form a vibratory source array based on a given attribute. The method includes a step 2400 of inputting plural constraints for the source elements; a step 2402 of generating plural distributions of the source elements that fulfill the plural constraints; a step 2404 of calculating for each distribution the given attribute characterizing the source array; and a step 2406 of selecting the best distribution from the plural distributions based on a value of the given attribute.

Figure 25:
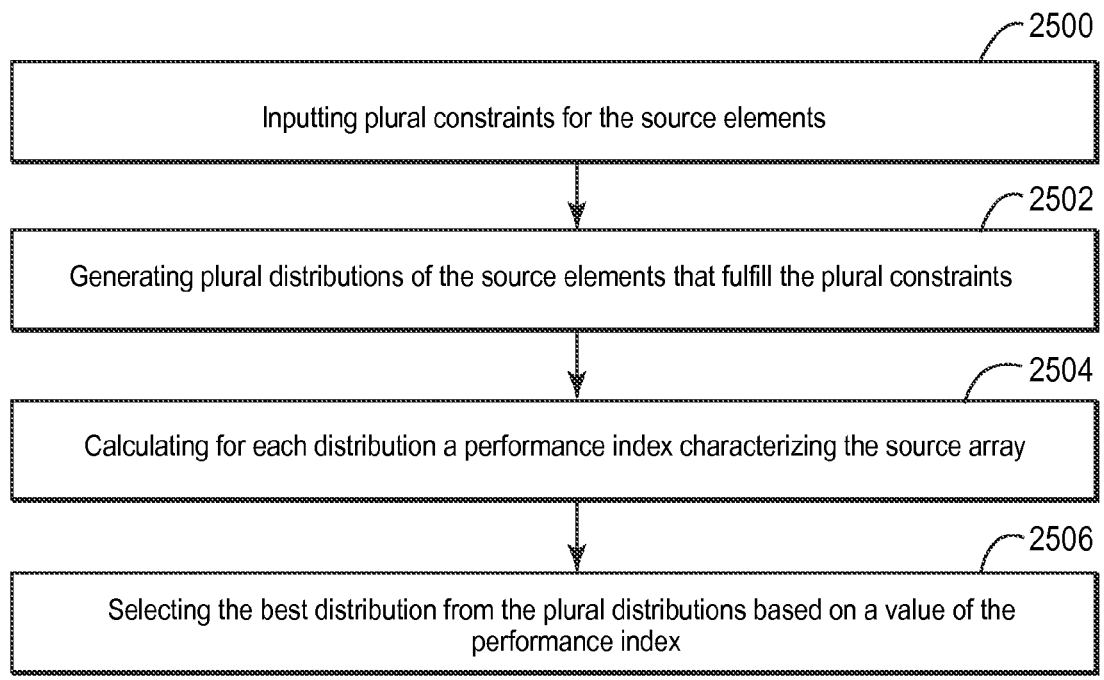
FIG. 25 is a flowchart of a method for finding a source elements distribution that achieves a desired beam shape according to an embodiment.

According to an embodiment illustrated in FIG. 25, there is a method for finding a best distribution of source elements that form a vibratory source array based on a performance index. The method includes a step 2500 of inputting plural constraints for the source elements; a step 2502 of generating plural distributions of the source elements that fulfill the plural constraints; a step 2504 of calculating for each distribution the performance index characterizing the source array; and a step 2506 of selecting the best distribution from the plural distributions based on a value of the performance index.

One or more of the methods discussed above may be modified based on a "frequency scaled array" concept now discussed. This concept means that if there is an optimal solution for a source array designed to cover one frequency range, the same solution can be applied to a second source array that may cover a different frequency range. In order to preserve the same frequency scaled beam directivity pattern and to apply the result from the first source array optimization, the second source array needs to be dimensionally scaled. For example, if the first source array covers the frequency range of F1 to F2 and the elements are at locations X, Y, Z with respect to the first array centroid, a frequency scaling factor SF needs to be applied to the second source array to cover frequency range SF×F1 to SF×F2. The source elements of the second source array need to be positioned at locations with respect to the center of the second source array given by (1/SF)×X, (1/SF)×Y, (1/SF)×Z. If the frequency ranges do not overlap, and both source arrays are being used at the same time, the center of the second source array can be offset from the center of the first source array without changing the far-field directivity pattern. If the number of source elements in the second source array is different than the number of source elements in the first source array, it is possible to use either interpolation or extrapolation to derive an appropriate solution if the desired directivity pattern is relatively smooth (not notchy) over the frequency range of interest.

Another improvement of the above-described embodiments is now discussed. This improvement deals with the concept of optimizing the geometry and/or drive signal(s) for a plurality of source arrays in which each source array generates a particular range of frequencies such that their combined effect meets/maintains an illumination objective over a wider range of frequencies. For example, a first source array might cover the range of 5-25 Hz and a second source array might cover the same 5:1 frequency range, i.e., 25-125 Hz. The second source array has the same overall shape as the first source array, but is scaled dimensionally in proportion to the frequencies of interest, as discussed above. Each source array may or may not be comprised of an identical number of source elements.

An illustrative example includes a first source array covering the band of 5-25 Hz operating at a depth of 25 m with a rectangular shape of 30 m in length (in towed direction) and 25 m in the cross-line direction. If the second source array covers the band ranging from 25-125 Hz, then it operates at five times the frequency of the first source array so the dimensional scaling factor would be five. The second source array would operate at a depth of 5 m with a rectangular shape of about 6 m in-line direction and 5 m in the cross-line direction. The resultant spectral notches due to the surface reflection for each source array will be frequency scaled by a factor of five. For example, there would be a ghost notch in the down-going energy for the first source array that falls at about 30.4 Hz if the speed of sound in water is 1520 m and peak in output at 15.2 Hz due to constructive interference from the free surface. These same effects would occur in the second source array with the notch falling at about 152 Hz and the peak at about 76 Hz, scaled in frequency by a factor of five. Likewise the directivity pattern vs. frequency for the second source array would match the directivity pattern vs. frequency for the first array with the same frequency scaling; for example the directivity pattern of the second array when operating at 50 Hz would produce the same pattern as the first array operating at 10 Hz. Note the frequency bands for each source array could also have some overlap like first source array 5-28 Hz and the second source array 25-140 Hz. Also the source arrays may be offset from one another and not necessarily stacked with one above the other. For example, assume that the second source array is towed behind the first source array. Seismic data might be recorded for the first source array operating at shot point 1, and then sometime later, the second source array arrives at shot point 1 where it operates and the information from its emission is recorded.

The same methodology may be applied to variable depth arrays like curved source arrays. If the curvature of the second source array was a frequency scaled version of the first source array, then the same directivity relationship should apply as for the case of two single-depth arrays.

For one embodiment, the source elements in the first source array can be identical in make/model and be operated using the same drive signal. The source elements that comprise the second source array can be identical in make/model and be operated using the same drive signal. However, the source elements from the first source array may be different than the source elements in the second source array.

In another embodiment, the source elements within each source array may not have the same drive signals applied to each source element within that source array. For example, a frequency variant phase-shifted version of the drive signal might be applied to different source elements within a given source array to alter or maintain a desired beam direction or beam shape as frequency changes. For example, the first source array covers the range of 5-25 Hz and phase shifts are applied to the drive signals going to the source elements that comprise the first source array such that the beam intensity is maximized at an angle of 10 degrees from vertical so that more energy could be directed in a preferred direction over the range of 5-25 Hz. The phase shifts applied to the second source array elements would be designed to direct the maximum radiated energy in the same preferred direction of 10 degrees for this simple example.

In still another embodiment, the location, phasing and amplitude of each source element in a first low-frequency source array might be selected to minimize the formation of side-lobes in the directivity pattern. For a second source array, i.e., the high-frequency source array, the source element positions, phasing and amplitude could be designed to observe the same objective of side-lobe minimization. By dividing the spectrum between the two source arrays, the low-frequency source array being of larger dimension than the second source array, it facilitates the ability to find phase and amplitude settings that will maintain good signal strength over the full bandwidth of interest without the creation of unwanted side lobes.

In still another embodiment, the source array dimension could be selected and drive signals designed so that the beam shape can be made variable to correspond to the expected frequencies to be received from different target depths. Low frequencies for example, may be more important for imaging subsalt, while higher frequencies are useful for pre-salt subterranean features. Generally, streamers can be quite long (e.g., 18 km) for surveys used in subsalt imaging. Thus, energy that is returning from subsalt images can have ray paths that deviate from vertical, more so than arrivals from shallow presalt events with returns to hydrophone receivers near the vessel closer to the vertical angle. For example, for the low frequencies, the beam shape could be adjusted to provide wide beam illumination and then for high frequencies, the beam shape can be focused to better image shallow reflections. If desired, and the low frequency array is large enough in dimension, the opposite could also be possible so that the low frequency energy is concentrated in a preferred direction, for example toward the rear of the streamer spread, while the high frequency emissions might have a wider beam illumination.

Figure 26:
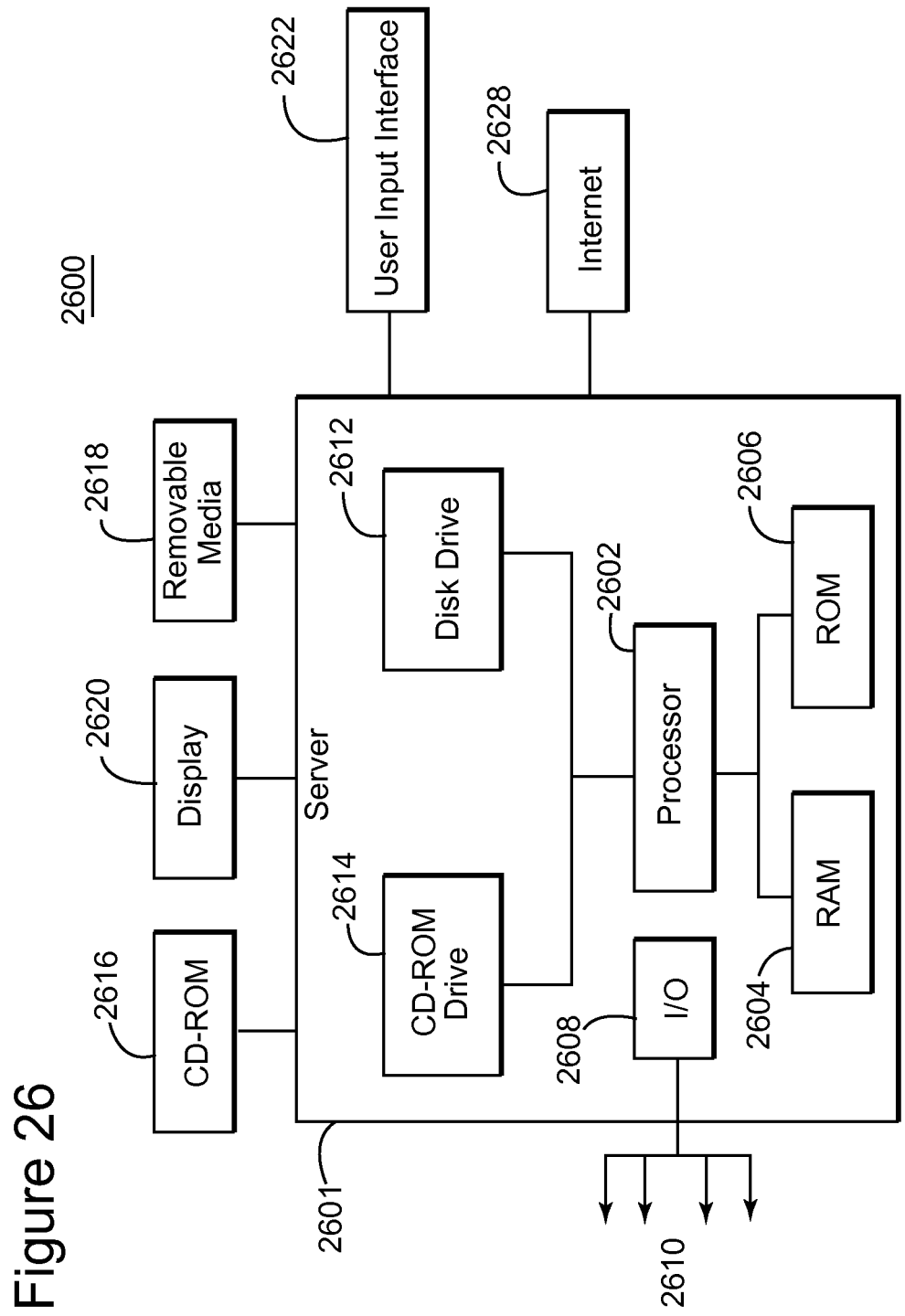
FIG. 26 is a schematic diagram of a control system.

An example of a representative control system capable of carrying out operations in accordance with the exemplary embodiments discussed above is illustrated in FIG. 26. Hardware, firmware, software or a combination thereof may be used to perform the various steps and operations described herein. The control system 2600 of FIG. 26 is an exemplary computing structure that may be used in connection with such a system, and it may implement any of the processes and methods discussed above or combinations of them.

The exemplary control system 2600 suitable for performing the activities described in the exemplary embodiments may include server 2601. Such a server 2601 may include a central processor unit (CPU) 2602 coupled to a random access memory (RAM) 2604 and to a read-only memory (ROM) 2606. The ROM 2606 may also be other types of storage media to store programs, such as programmable ROM (PROM), erasable PROM (EPROM), etc. The processor 2602 may communicate with other internal and external components through input/output (I/O) circuitry 2608 and bussing 2610, to provide control signals and the like. For example, the processor 2602 may communicate with the sensors, electro-magnetic actuator system and/or the pressure mechanism. The processor 2602 carries out a variety of functions as are known in the art, as dictated by software and/or firmware instructions.

The server 2601 may also include one or more data storage devices, including hard and disk drives 2612, CD-ROM drives 2614, and other hardware capable of reading and/or storing information, such as a DVD, etc. In one embodiment, software for carrying out the above-discussed steps may be stored and distributed on a CD-ROM 2616, removable media 2618 or other form of media capable of portably storing information. These storage media may be inserted into, and read by, devices such as the CD-ROM drive 2614, the disk drive 2612, etc. The server 2601 may be coupled to a display 2620, which may be any type of known display or presentation screen, such as LCD, plasma displays, cathode ray tubes (CRT), etc. A user input interface 2622 is provided, including one or more user interface mechanisms such as a mouse, keyboard, microphone, touch pad, touch screen, voice-recognition system, etc.

The server 2601 may be coupled to other computing devices, such as the equipment of a vessel, via a network. The server may be part of a larger network configuration as in a global area network (GAN) such as the Internet 2628, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

The disclosed exemplary embodiments provide a source array, seismic vibro-acoustic source element and a method for finding source elements distribution that achieves one or more desired features, e.g., beam directivity, load distribution, etc. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for finding a best distribution of marine source elements that form a marine vibratory source array which is towed by a vessel in water, the method comprising:
    inputting plural constraints for the marine source elements;
    generating plural distributions of the marine source elements that fulfill the plural constraints;
    calculating for each distribution a first attribute characterizing the marine source array; and
    selecting the best distribution from the plural distributions based on a value of the first attribute,
    wherein the first attribute includes a self-impedance part and a mutual-impedance part, the mutual-impedance part describing a load exerted by one marine source element onto another marine source element and the self-impedance part describing a single marine source element.

2. The method of claim 1, further comprising:
    calculating for each distribution a second attribute characterizing the source array; and
    selecting the best distribution from the plural distributions based on both the first and second attributes.

3. The method of claim 1, wherein the plural constraints include a geometry of the source array.

4. The method of claim 3, wherein the geometry of the source array includes a depth range, a length range and a width range.

5. The method of claim 3, wherein the geometry includes a number of lines that are towed by a vessel and on which the source elements are distributed when in water.

6. The method of claim 3, wherein the geometry includes a number of curved lines on which the source elements are distributed when in water.

7. The method of claim 6, wherein the curved lines has a sinusoid shape.

8. A method for finding a best distribution of source elements that form a vibratory source array, the method comprising:
    inputting plural constraints for the source elements;
    generating plural distributions of the source elements that fulfill the plural constraints;
    calculating for each distribution a first attribute characterizing the source array; and
    selecting the best distribution from the plural distributions based on a value of the first attribute,
    wherein the first attribute is a maximum total acoustic radiation impedance for the source elements.

9. The method of claim 8, wherein the maximum total acoustic radiation impedance is selected as the maximum of the total acoustic radiation impedances of the source elements.

10. The method of claim 9, wherein a total acoustic radiation impedance of a given source element takes into account an influence from all other source elements.

11. The method of claim 10, further comprising:
    calculating for each distribution a second attribute characterizing the source array; and
    selecting the best distribution from the plural distributions based on both the first and second attributes.

12. The method of claim 11, wherein the second attribute is a far-field signal beam shape.

13. The method of claim 12, wherein the best distribution is selected when the second attribute deviates by less than 20% in beam strength for vertical angles less than 30 degrees and an azimuth angle between about −45 and +45 degrees.

14. A method for finding a best distribution of source elements that form a vibratory source array, the method comprising:
    inputting plural constraints for the source elements;
    generating plural distributions of the source elements that fulfill the plural constraints;
    calculating for each distribution and for each source element a total acoustic radiation impedance;
    selecting a maximum total acoustic radiation impedance from total acoustic radiation impedances corresponding to the source elements; and
    selecting the best distribution from the plural distributions based on a minimization process applied to the maximum total acoustic impedance.

15. The method of claim 14, further comprising:
    calculating for each distribution a far-field signal shape of a beam generated by the source array; and
    selecting the best distribution from the plural distributions when a deviation of the far-field signal shape is less than a threshold.

16. The method of claim 15, wherein the deviation is less than 20% in beam strength for vertical angles less than 30 degrees and an azimuth angle between about −45 and +45 degrees.

17. The method of claim 14, further comprising:
    implementing the best distribution for the source array during a seismic survey.

18. The method of claim 14, wherein the step of selecting the best distribution comprises:
    calculating a performance index associated with a beam directivity of the source array;
    optimizing both the first attribute and the performance index to select the best distribution.

19. A controller for calculating a best distribution of marine source elements that form a marine vibratory source array which is towed by a vessel in water, the controller comprising:
    an interface for receiving plural constraints for the marine source elements; and
    a processor connected to the interface and configured to,
    generate plural distributions of the marine source elements that fulfill the plural constraints;
    calculate for each distribution a first attribute characterizing the marine source array; and
    select the best distribution from the plural distributions based on a value of the first attribute,
    wherein the first attribute includes a self-impedance part and a mutual-impedance part, the mutual-impedance part describing a load exerted by one marine source element onto another marine source element and the self-impedance part describing a single marine source element.

20. The controller of claim 19, wherein the processor is further configured to:
    calculate for each distribution a second attribute characterizing the source array; and
    select the best distribution from the plural distributions based on both the first and second attributes.

* * * * *